United States Patent
Katagi et al.

(10) Patent No.: US 11,208,525 B2
(45) Date of Patent: *Dec. 28, 2021

(54) EPOXY RESIN, EPOXY RESIN COMPOSITION, INORGANIC FILLER-CONTAINING EPOXY RESIN COMPOSITION, RESIN SHEET, CURED PRODUCT, AND EPOXY COMPOUND

(71) Applicant: HITACHI CHEMICAL COMPANY, LTD., Tokyo (JP)

(72) Inventors: Hideyuki Katagi, Tokyo (JP); Kenji Tanaka, Tokyo (JP); Yoshitaka Takezawa, Tokyo (JP); Haruaki Sue, Tokyo (JP); Shinichi Kosugi, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,073

(22) Filed: May 1, 2019

(65) Prior Publication Data

US 2019/0256643 A1 Aug. 22, 2019

Related U.S. Application Data

(62) Division of application No. 15/539,974, filed as application No. PCT/JP2015/086373 on Dec. 25, 2015, now Pat. No. 10,934,387.

(30) Foreign Application Priority Data

Dec. 26, 2014 (JP) ................. 2014-266106

(51) Int. Cl.
  *C08G 59/24* (2006.01)
  *C08J 5/18* (2006.01)
  *C08G 59/62* (2006.01)

(52) U.S. Cl.
  CPC .......... *C08G 59/24* (2013.01); *C08G 59/245* (2013.01); *C08G 59/62* (2013.01); *C08G 59/621* (2013.01); *C08J 5/18* (2013.01)

(58) Field of Classification Search
  CPC ...... C08G 59/24; C08G 59/245; C08G 59/62; C08G 59/621; C08J 5/18
  USPC ......................................... 523/400
  See application file for complete search history.

(56) References Cited

U.S. PATENT DOCUMENTS

| | | | |
|---|---|---|---|
| 2003/0229159 A1* | 12/2003 | Akatsuka | C08G 59/02 523/457 |
| 2004/0147709 A1 | 7/2004 | Atatsuka et al. | |
| 2012/0149807 A1 | 6/2012 | Asaumi et al. | |

FOREIGN PATENT DOCUMENTS

| | | | | |
|---|---|---|---|---|
| EP | 2484724 A1 | 8/2012 | | |
| JP | 2002-226550 A | 8/2002 | | |
| JP | 4118691 B2 | 7/2008 | | |
| JP | 2009-215390 A | 9/2009 | | |
| JP | 2010-047728 A | 3/2010 | | |
| JP | 2010-241797 A | 10/2010 | | |
| JP | 4619770 B2 | 1/2011 | | |
| JP | 2011-098952 A | 5/2011 | | |
| JP | 4889110 B2 | 3/2012 | | |
| JP | 2012-233206 A | 11/2012 | | |
| JP | 2013-227451 A | 7/2013 | | |
| JP | 2013-227451 A | 11/2013 | | |
| JP | 2013-234313 A | 11/2013 | | |
| JP | 2013234313 A * | 11/2013 | ............... | C08K 3/22 |
| JP | 5471975 B2 | 4/2014 | | |

OTHER PUBLICATIONS

Yoshida et al., JP 2013-234313 A machine translation in English, Nov. 21, 2013 (Year: 2013).*
International Search Report for PCT/JP2015/086373 dated Mar. 22, 2016; English translation submitted herewith (5 pages).
Akatsuka et al., JP 2002-226550 A machine translation in English, Aug. 14, 2002 (Year: 2002).

* cited by examiner

*Primary Examiner* — David T Karst
(74) *Attorney, Agent, or Firm* — Fitch, Even, Tabin & Flannery, LLP

(57) ABSTRACT

An epoxy resin obtained by a reaction of an epoxy resin monomer having a mesogen backbone and having two glycidyl groups in one molecule with a divalent phenol compound having, as substituents, two hydroxyl groups on one benzene ring, in which a number average molecular weight in gel permeation chromatographic measurement is from 600 to 2,500.

12 Claims, No Drawings

EPOXY RESIN, EPOXY RESIN COMPOSITION, INORGANIC FILLER-CONTAINING EPOXY RESIN COMPOSITION, RESIN SHEET, CURED PRODUCT, AND EPOXY COMPOUND

CROSS-REFERENCE TO RELATED APPLICATIONS

This application is a divisional application of U.S. application Ser. No. 15/539,974, filed Jun. 26, 2017, which is a U.S. national phase application filed under 35 U.S.C. § 371 of International Application No. PCT/JP2015/086373, filed Dec. 25, 2015, designating the United States, which claims priority from Japanese Patent Application No. 2014-266106, filed Dec. 26, 2014, which are all hereby incorporated herein by reference in their entireties.

TECHNICAL FIELD

The present disclosure relates to an epoxy resin, an epoxy resin composition, an inorganic filler-containing epoxy resin composition, a resin sheet, a cured product, and an epoxy compound.

BACKGROUND ART

Recently, semiconductor package devices are required to have provisions for heat dissipation because of being higher in actual operation temperature due to increases in density and integration. Silicon carbide (SiC), which enables greater increase in output, has been actively studied to be applied, instead of silicon, particularly in the field of power devices for use in electric cars, hybrid cars, industrial equipment, and the like, and peripheral materials having heat resistance and high heat conductivity have been demanded. Such peripheral materials are also needed to have high insulation performance, depending on the section to which the material is applied.

As the peripheral material surrounding a power device, organic materials have been increasingly used, in accordance with the trend of decreases in size and weight, instead of inorganic materials such as ceramics which have been heretofore used. Examples of the form of the organic materials to be used include a composite material made of a mixture of an organic polymer (resin) and an inorganic filler.

Organic materials have a problem of being low in heat resistance, while having many advantages such as high material processability and weight-reducing ability, as compared with inorganic materials. As a material, the organic materials also have lower heat conductivity compared to inorganic materials, and have a heat conductivity of about 0.2 W/(m·K) in the form of a general-purpose resin.

As a technique for improving heat resistance of an organic material, a technique is generally known in which a rigid backbone is introduced to the structure of a resin to be used and/or the crosslinking point density of the resin is increased, whereby the distance between crosslinking points after curing is shortened and/or the glass transition temperature is raised.

Meanwhile, as a technique for increasing heat conductivity, a technique in which an inorganic filler typified by alumina or boron nitride having a high heat conductivity is used, is known (see, for example, Japanese Patent No. 4889110). A technique is also known in which an increase in heat conductivity is achieved by introducing a rigid structure, typified by one referred to as a mesogen backbone, into the molecule of a resin, thereby allowing the resin to exhibit liquid crystallinity or crystallinity by use of intermolecular stacking characteristics and to be suppressed in phonon scattering (see, for example, Japanese Patent No. 4118691). While the former technique can increase the heat conductivity of a composite material due to an increase in the amount of filling, the maximum amount of filling is limited from the viewpoint that insulation property is simultaneously satisfied, and the heat conductivity of a composite material is thus caused to plateau. In contrast, a resin high in heat conductivity with respect to the latter technique can be used to dramatically increase the heat conductivity of a composite material.

There is, however, an increase in the melting temperature of the resin as an extension of the latter technique, and the following problem is thus caused: handling property is deteriorated, for example, fluidity is deteriorated, and/or adhesiveness with an adherend is deteriorated.

SUMMARY OF INVENTION

Technical Problem

The present invention aims to provide an epoxy resin having superior fluidity and superior heat conductivity, an epoxy resin composition, an inorganic filler-containing epoxy resin composition, a resin sheet and a cured product using the epoxy resin, and an epoxy compound.

Solution to Problem

The inventors have made intensive studies in order to achieve the above object, and as a result, have led to the invention. That is, the invention encompasses the following aspects.

<1> An epoxy resin, which is a reaction product of an epoxy resin monomer having a mesogen backbone and having two glycidyl groups in a molecule thereof with a divalent phenol compound having, as substituents, two hydroxyl groups on one benzene ring, wherein the epoxy resin has a number average molecular weight in gel permeation chromatographic measurement of from 600 to 2,500.

<2> The epoxy resin according to <1>, wherein the divalent phenol compound comprises hydroquinone.

<3> The epoxy resin according to <1> or <2>, wherein the epoxy resin monomer comprises trans-4-{4-(2,3-epoxypropoxy)phenyl}cyclohekyl 4-(2,3-epoxypropoxy)benzoate.

<4> An epoxy resin composition, comprising:
the epoxy resin according to any one of <1> to <3>; and
an epoxy resin monomer having a mesogen backbone,
wherein the epoxy resin composition has a softening temperature measured by a ring-and-ball method of 100° C. or less.

<5> An inorganic filler-containing epoxy resin composition, comprising:
the epoxy resin according to any one of <1> to <3> or the epoxy resin composition according to <4>; and
an inorganic filler.

<6> The inorganic filler-containing epoxy resin composition according to <5>, wherein a heat conductivity of a cured product thereof is 7 W/(m·K) or more.

<7> A resin sheet, which is a sheet-shaped molded article of the inorganic filler-containing epoxy resin composition according to <5> or <6>.

<8> A cured product obtained by curing the inorganic filler-containing epoxy resin composition according to <5> or <6>, or the resin sheet according to <7>.

<9> The cured product according to <8>, having a diffraction peak in a range of diffraction angle 2θ=3.0° to 3.5° according to an X-ray diffraction method using Cukα rays.

<10> An epoxy compound represented by the following Formula (1):

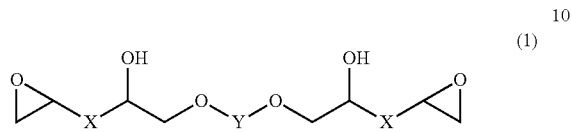

(1)

wherein, in Formula (1), each X independently represents a divalent group having a mesogen backbone, and Y represents a phenylene group optionally having a substituent.

<11> The epoxy compound according to <10>, represented by at least one of the following Formulae (2-1) to (2-3):

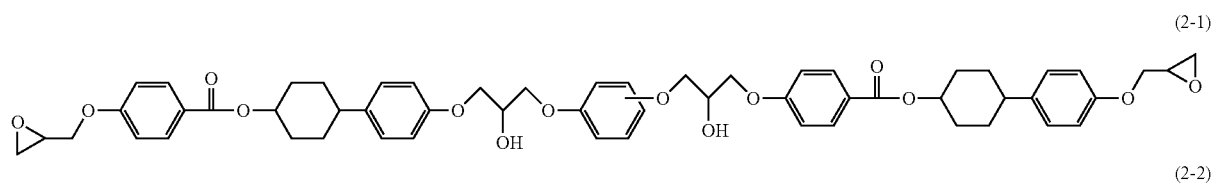

(2-1)

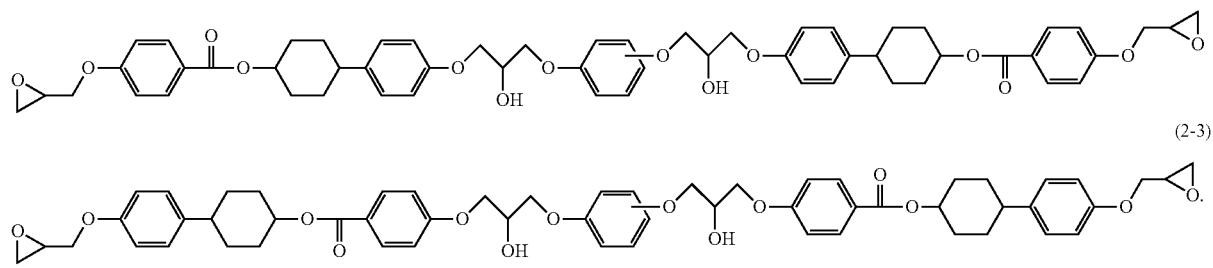

(2-2)

(2-3)

<12> The epoxy compound according to <10> or <11>, represented by at least one of the following Formulae (3-1) to (3-3):

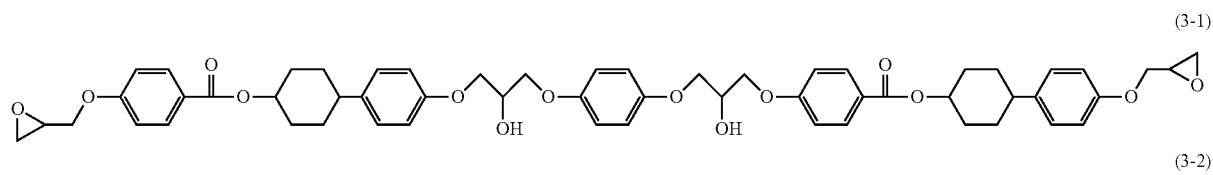

(3-1)

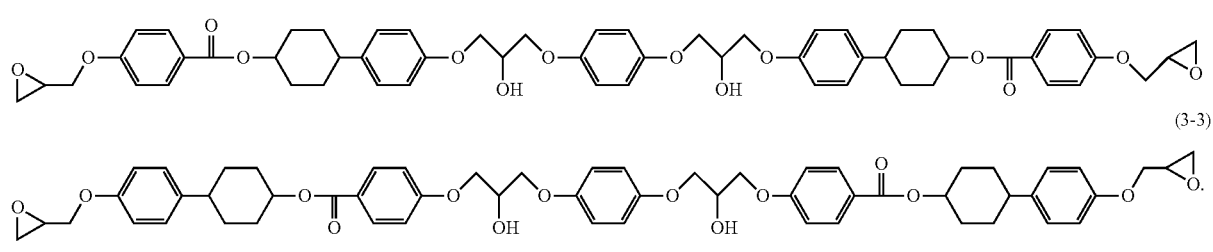

(3-2)

(3-3)

<13> The epoxy compound according to <10> or <11>, represented by at least one of the following Formulae (4-1) to (4-3):

(4-1)

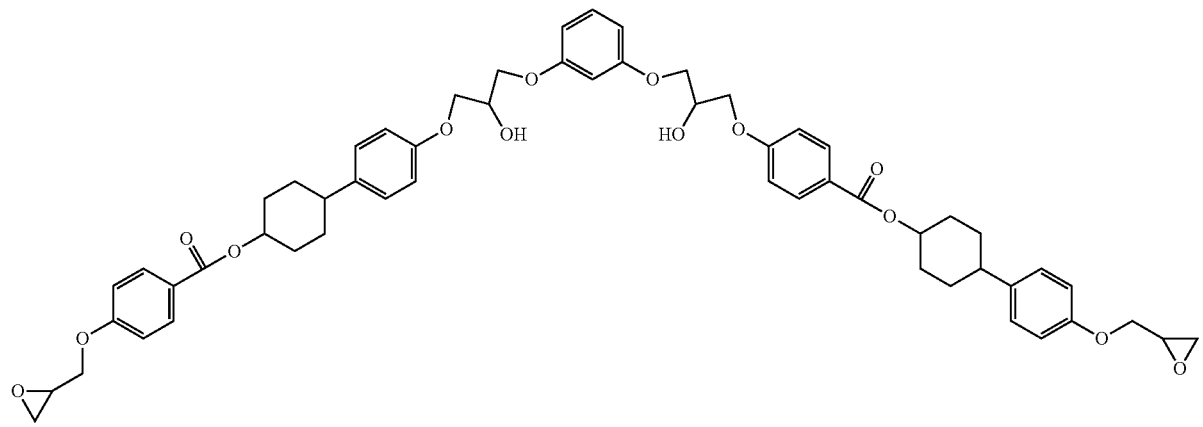

(4-2)

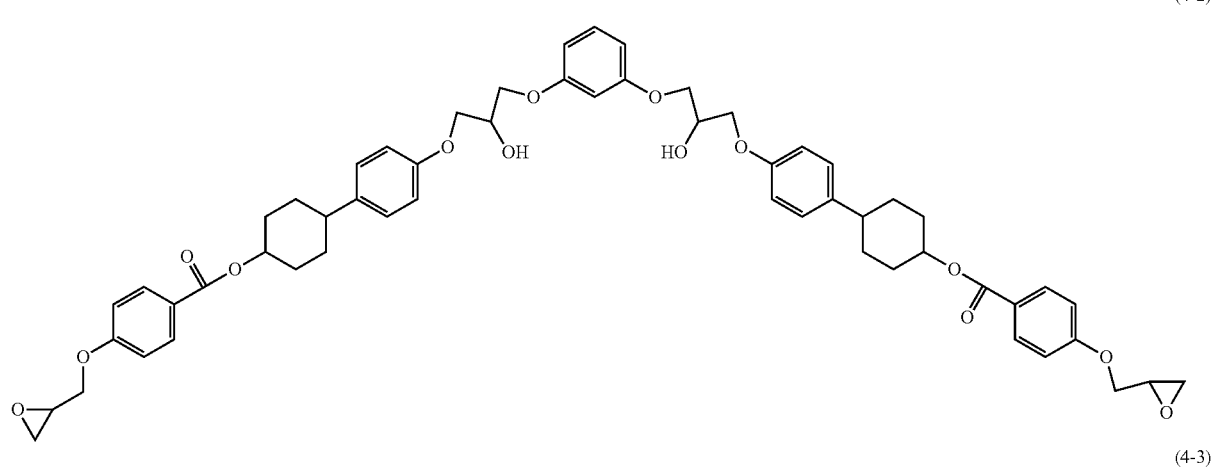

(4-3)

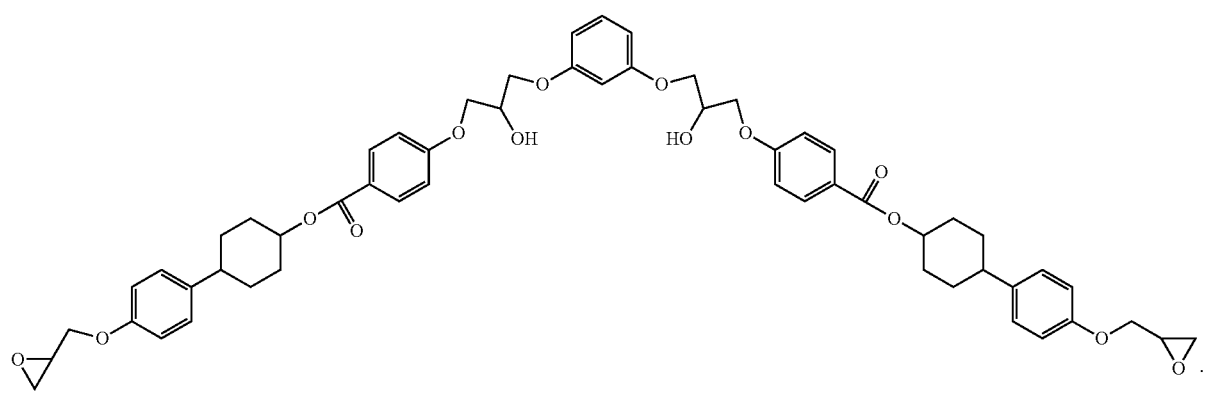

<14> An inorganic filler-containing epoxy resin composition, comprising:
the epoxy compound according to any one of <9> to <13>; and an inorganic filler.

<15> A cured product obtained by curing the epoxy compound according to any one of <9> to <13>, or the inorganic filler-containing epoxy resin composition according to <14>.

Advantageous Effects of Invention

According to the invention, an epoxy resin having superior fluidity and superior heat conductivity, an epoxy resin composition, an inorganic filler-containing epoxy resin composition, a resin sheet and a cured product using the epoxy resin, and an epoxy compound are provided.

DESCRIPTION OF EMBODIMENTS

Hereinafter, embodiments of the invention will be described. The following embodiments are illustrative for describing the invention, and the invention is not limited to only such embodiments and can be in any of various forms without departing from the gist thereof.

Any numerical value range indicated by the term "to" represents any range including the numerical values described before and after the term "to" as the minimum value and the maximum value, respectively.

The upper limit or the lower limit described in one numerical value range stepwisely described herein may be replaced with the upper limit or the lower limit described in another numerical value range stepwisely described herein, respectively. The upper limit or the lower limit of any numerical value range described herein may also be replaced with that described in Examples.

When a plurality of substances are present in each component of a composition, the content of such a component in the composition means the total amount of the plurality of substances present in the composition, unless especially noted.

<Epoxy Resin>

An epoxy resin according to an embodiment of the invention is obtained by a reaction of an epoxy resin monomer having a mesogen backbone and having two glycidyl groups in a molecule thereof with a divalent phenol compound having, as substituents, two hydroxyl groups on one benzene ring, in which the epoxy resin has a number average molecular weight in gel permeation chromatographic (GPC) measurement of from 600 to 2,00. The epoxy resin according the embodiment is excellent in fluidity and heat conductivity, and therefore is suitably used for an inorganic filler-containing epoxy resin composition and a resin sheet described below, for example.

The term "mesogen backbone" as used herein refers to a molecular structure which allows crystallinity or liquid crystallinity to be easily exhibited. Specific examples thereof include a biphenyl backbone, a phenylbenzoate backbone, an azobenzene backbone, a stilbene backbone, a cyclohexylbenzene backbone, and derivatives thereof. An epoxy resin monomer having a mesogen backbone in a molecular structure thereof tends to easily form a higher-order structure when the epoxy resin monomer is cured, and tends to impart higher heat conductivity to a cured product of the epoxy resin. The term "higher-order structure" as used herein refers to a state in which such constituent components are microscopically aligned, and examples of such a structure include a crystal phase and a liquid crystal phase. Whether such a higher-order structure is present or not may be easily determined by observation using a polarization microscope. That is, it can be determined that the higher-order structure is present, in a case in which an interference pattern due to depolarization is observed in a crossed Nicol state.

The epoxy resin according to the embodiment is synthesized by using an epoxy resin monomer having a mesogen backbone and having two glycidyl groups in a molecule thereof. In a case in which one glycidyl group is present in one molecule, the crosslinking density after curing may be decreased, resulting in a lower heat conductivity. In a case in which three or more glycidyl groups are present in one molecule, the control of a polymerization reaction tends to be difficult and gelation tends to be caused.

Representative examples of the epoxy resin monomer having a mesogen backbone and having two glycidyl groups in a molecule thereof include a biphenyl type epoxy resin. Examples of a commercial product thereof include YX4000 (manufactured by Mitsubishi Chemical Co., Ltd.) and YL6121H (manufactured by Mitsubishi Chemical Co., Ltd.). Specific examples of a tricyclic epoxy resin monomer include an epoxy resin monomer having a terphenyl backbone, 1-(3-methyl-4-oxiranylmethoxyphenyl)-4-(4-oxiranylmethoxyphenyl)-1-cyclohexene, 1-(3-methyl-4-oxiranylmethoxyphenyl)-4-(4-oxiranylmethoxyphenyl)-benzene (manufactured by Sumitomo Chemical Co., Ltd.), and trans-4-{4-(2,3-epoxypropoxy)phenyl}cyclohexyl 4-(2,3-epoxypropoxy)benzoate (manufactured by Sumitomo Chemical Co., Ltd.). Among these epoxy resin monomers, trans-4-{4-(2,3-epoxypropoxy)phenyl} cyclohexyl 4-(2,3-epoxypropoxy)benzoate is preferably used from the viewpoint of improving heat conductivity.

These epoxy resin monomers may be used singly, or in combination of two or more kinds thereof.

For the synthesis of the epoxy resin according to the embodiment, a divalent phenol compound having, as substituents, two hydroxyl groups on one benzene ring is used as a binder. Such a divalent phenol compound is preferably used from the viewpoint of controlling the molecular weight, the heat conductivity and the glass transition temperature (Tg) of the epoxy resin. In a case in which one hydroxyl group is present in one molecule, the crosslinking density after curing tends to decrease, resulting in a lower heat conductivity. In a case in which three or more hydroxyl groups are present in one molecule, the control of a polymerization reaction tends to be difficult and gelation may be caused. In a case in which a divalent phenol compound having two or more benzene rings is used, it is advantageous for attaining higher heat conductivity because the structure of the resulting epoxy resin is more rigid, but the softening temperature tends to be higher, thereby deteriorating handling property (see, for example, Japanese Patent No. 5019272).

As a binder used in polymerization of an epoxy resin monomer, an amine compound is also known in addition to the phenol compound. In a case in which an amine compound is used as a binder, the amine compound generates a secondary amine or a tertiary amine in the resulting epoxy resin, thereby deteriorating storage stability of the epoxy resin by itself and storage stability of a resin composition after the epoxy resin is compounded with a curing agent.

Examples of the divalent phenol compound having, as substituents, two hydroxyl groups on one benzene ring include catechol, resorcinol, hydroquinone, and derivatives thereof. Examples of the derivatives include a compound in which the benzene ring is substituted by a substituent such as an alkyl group having 1 to 8 carbon atoms. Among these divalent phenol compounds, hydroquinone is preferably used from the viewpoint of improving heat conductivity. Hydroquinone has a structure obtained by substitution so that two hydroxyl groups are in a para-position relationship, and whereby an epoxy resin obtained by a reaction with the epoxy resin monomer has a linear structure. It is thus considered that higher stacking characteristics are obtained, and a higher-order structure is easily obtained.

These divalent phenol compounds may be used singly, or in combination of two or more kinds thereof.

The epoxy resin according to an embodiment has a number average molecular weight measured by gel permeation chromatographic (GPC) of from 600 to 2,500. The number average molecular weight is preferably from 800 to 2,000, and more preferably from 1,000 to 1,800, from the viewpoint of balance between fluidity and heat conductivity. In a case in which the number average molecular weight of the epoxy resin is less than 600, crystallinity tends to be higher, thereby lowering fluidity. In a case in which the number average molecular weight of the epoxy resin is more than 2,500, the crosslinking point density of a cured product tends to be lower, resulting in a lower heat conductivity.

The number average molecular weight herein is measured under the following measurement conditions.

[Measurement Conditions]

Pump: L-6000 (manufactured by Hitachi, Ltd.)

Column: TSKgel (registered trademark) G4000H$_{HR}$+G3000H$_{HR}$+G2000H$_{XL}$ (manufactured by TOSOH CORPORATION)

Column temperature: 40° C.

Elution solvent: tetrahydrofuran (containing no stabilizer for chromatography, manufactured by Wako Pure Chemical Industries, Ltd.)

Sample concentration: 5 g/L (soluble content in tetrahydrofuran)

Amount of injection: 100 μL

Flow rate: 1.0 mL/min

Detector: differential refractometer RI-8020 (manufactured by TOSOH CORPORATION)

Standard substance for calibration of molecular weight: standard polystyrene

Data processing apparatus: GPC-8020 (manufactured by TOSOH CORPORATION)

It is preferable that the epoxy resin according to an embodiment is capable of changing its state from a crystal phase to a liquid crystal phase at a temperature of less than 140° C. In a case in which the epoxy resin changes its state from a crystal phase to a liquid crystal phase at a temperature of less than 140° C., fluidity and moldability tend to be improved.

Although the temperature at which transition from a crystal phase to a liquid crystal phase of trans-4-{4-(2,3-epoxypropoxy)phenyl}cyclohexyl 4-(2,3-epoxypropoxy) benzoate as the epoxy resin monomer occurs is 140° C. or more, it is capable of adjusting the temperature at which transition from a crystal phase to a liquid crystal phase occurs to be less than 140° C., by allowing such a monomer to react with the divalent phenol compound to convert to the epoxy resin according to the embodiment.

The temperature at which transition from a crystal phase to a liquid crystal phase occurs may be measured using a differential scanning calorimetry (DSC) measurement apparatus (for example, Pyris 1 manufactured by PerkinElmer Co., Ltd.). Specifically, the temperature may be measured as a temperature at which any energy change (endothermic reaction) in accordance with a phase transition reaction occurs during differential scanning calorimetry measurement of 3 mg to 5 mg of an epoxy resin sample enclosed in an aluminum pan under conditions of a rate of temperature increase of 20° C./min, a measurement temperature range from 25° C. to 350° C. and a nitrogen flow rate of 20±5 mL/min in a nitrogen atmosphere.

The epoxy resin according to the embodiment may be synthesized by dissolving the epoxy resin monomer, the divalent phenol compound and a curing catalyst in a synthesis solvent, and stirring them with the application of heat. Although the epoxy resin may also be synthesized by melting and reacting the epoxy resin monomer without any solvent, the epoxy resin monomer is needed to be heated to a high temperature at which the epoxy resin monomer is molten. Therefore, a synthesis method using a synthesis solvent is preferable in terms of safety.

The synthesis solvent is not particularly limited as long as the solvent is capable of being warmed to a temperature necessary for allowing a reaction between the epoxy resin monomer and the divalent phenol compound to proceed. Specific examples of the synthesis solvent include cyclohexanone, cyclopentanone, ethyl lactate, propylene glycol monomethyl ether and N-methylpyrrolidone.

The minimum amount of the synthesis solvent, to be required, is an amount which enables all the epoxy resin monomer, the divalent phenol compound and the curing catalyst to be dissolved at the reaction temperature. A concentration of the solid content to be charged may be from 20% by mass to 60% by mass because a favorable viscosity range of a resin solution after synthesis is achieved, while the solubility may vary depending on the types of raw materials before the reaction, the type of the solvent, and the like.

The type of the curing catalyst is not particularly limited, and an appropriate catalyst may be selected in terms of the reaction speed, the reaction temperature, the storage stability, or the like. Specific examples of the curing catalyst include an imidazole compound, an organic phosphorus compound, a tertiary amine and a quaternary ammonium salt. These catalysts may be used singly, or in combination of two or more kinds thereof. Among them, at least one selected from the group consisting of: an organic phosphine compound; a compound having intramolecular polarization, obtained by addition of a compound having a π bond such as maleic anhydride, a quinone compound (such as 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, or phenyl-1,4-benzoquinone), diazophenylmethane or a phenol resin to an organic phosphine compound; and a complex of an organic phosphine compound and an organic boron compound (such as tetraphenyl borate, tetra-p-tolyl borate, or tetra-n-butyl borate) is preferable from the viewpoint of heat resistance.

Specific examples of the organic phosphine compound include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl) phosphine, tris(dialkoxyphenyl)phosphine, tris(trialkoxyphenyl)phosphine, tris(tetraalkoxyphenyl)phosphine, trialkyl phosphine, dialkyl aryl phosphine and alkyl diaryl phosphine.

The amount of the curing catalyst is not particularly limited. The amount is preferably from 0.1% by mass to 1.5% by mass, and more preferably from 0.2% by mass to 1% by mass, with respect to the total mass of the epoxy resin monomer and the divalent phenol compound from the viewpoint of reaction speed and storage stability.

In a case of small scale production, the epoxy resin according to the embodiment may be synthesized using a glass flask. In a case of large scale production, the epoxy resin may be synthesized using a stainless synthesis tank. A specific synthesis method is as follows, for example. First, the epoxy resin monomer is charged into a flask or a synthesis tank, a synthesis solvent is put therein, and the resultant is heated to a reaction temperature using an oil bath or a heat medium, thereby melting the epoxy resin monomer. Then, the divalent phenol compound is charged thereto and confer lied to be uniformly molten in the synthesis solvent, thereafter the curing catalyst is charged to start the reaction. The reaction solution is taken out after a lapse of a predetermined time, thereby obtaining an epoxy resin solution. Alternatively, the synthesis solvent is distilled off under the heating condition and under reduced pressure in the flask or the synthesis tank, whereby an epoxy resin is obtained as a solid at room temperature.

The reaction temperature is not limited as long as the reaction between an epoxy group and a phenolic hydroxyl group progresses in the presence of the curing catalyst. The reaction temperature is, for example, preferably in a range from 100° C. to 180° C., and more preferably in a range from 120° C. to 170° C. In a case in which the reaction temperature is set at 100° C. or more, the period until the reaction is completed tends to be more shortened. In a case in which the reaction temperature is set at 180° C. or less, the possibility of gelation tends to be reduced.

The epoxy resin according to an embodiment may be synthesized with the equivalent ratio of the epoxy resin monomer and the divalent phenol compound being varied. Specifically, the epoxy resin may be synthesized with the ratio (Ep/Ph) of the number of equivalents (Ep) of the epoxy group in the epoxy resin monomer and the number of equivalents (Ph) of the phenolic hydroxyl group in the divalent phenol compound being in a range from 100/100 to 100/1. The ratio Ep/Ph is preferably in a range of from 100/50 to 100/5 from the viewpoints of fluidity, heat resistance and heat conductivity of the epoxy resin. In a case in which the ratio (Ep/Ph) is 100/5 or less, the resulting epoxy resin tends to have a lower softening temperature and a higher fluidity. In a case in which the ratio (Ep/Ph) is 100/50 or more, the crosslinking point density tends to be suppressed from being decreased, and heat resistance and heat conductivity tend to be increased.

The epoxy resin according to an embodiment has excellent fluidity and excellent heat conductivity, and may be used as a material of an inorganic filler-containing epoxy resin composition and resin sheet described below. The inorganic filler-containing epoxy resin composition and resin sheet are expected for development in heat dissipation materials for motors or inverters of electric cars, hybrid cars, industrial equipment, and the like, heat dissipation materials for printed-wiring boards, sealing materials for semiconductor elements, and the like.

<Epoxy Resin Composition>

An epoxy resin composition according to an embodiment of the invention contains: the epoxy resin described above; and an epoxy resin monomer having a mesogen backbone, and has a softening temperature measured by a ring-and-ball method of 100° C. or less. In a case in which the softening point is 100° C. or less, fluidity of the epoxy resin composition is ensured. The epoxy resin composition according to the embodiment contains no inorganic filler, unlike the inorganic filler-containing epoxy resin composition described below.

The softening temperature herein is measured as follows. First, the epoxy resin composition heated and molten is poured into a metallic tool and cooled to room temperature (25° C.), thereby filling the metallic tool with the epoxy resin composition. Next, the metallic tool filled with the epoxy resin composition is installed in an oil bath of a measuring instrument at room temperature, and a ring globe is loaded onto the epoxy resin composition. The temperature of the oil bath is raised, and the temperature at which the ring globe is sunk in the epoxy resin composition is read as the softening temperature.

The mesogen backbone of the epoxy resin monomer in the epoxy resin composition is preferably the same as the mesogen backbone of the epoxy resin according to the embodiment from the viewpoints that a cured product exhibits liquid crystallinity or crystallinity, thereby having a higher-order structure, and that a higher heat conductivity is achieved. In a case in which the mesogen backbone of the epoxy resin monomer is different from the mesogen backbone of the epoxy resin, intermolecular stacking may be deteriorated, thereby making formation of a higher-order structure difficult.

The contents of the epoxy resin according to the embodiment and the epoxy resin monomer having a mesogen backbone in the epoxy resin composition are not particularly limited, as long as the softening temperature measured by a ring-and-ball method is 100° C. or less. The content of the epoxy resin according to the embodiment in the epoxy resin composition is preferably from 1% by mass to 30% by mass, and more preferably from 5% by mass to 20% by mass. The content of the epoxy resin monomer having a mesogen backbone in the epoxy resin composition is preferably from 70% by mass to 99% by mass, and more preferably from 80% by mass to 95% by mass.

The solid obtained by distilling off the synthesis solvent from the solution after reaction obtained in synthesis of the epoxy resin according to the embodiment includes the unreacted epoxy resin monomer, together with the epoxy resin according to the embodiment. The solid after the synthesis solvent is distilled off may be thus used as the epoxy resin composition according to the embodiment.

The epoxy resin composition according to the embodiment is preferably one in which transition from a crystal phase to a liquid crystal phase occurs at a temperature of less than 140° C. In a case in which the temperature at which transition from a crystal phase to a liquid crystal phase occurs is less than 140° C., fluidity and moldability tend to be improved.

<Inorganic Filler-Containing Epoxy Resin Composition>

An inorganic filler-containing epoxy resin composition according to an embodiment of the invention contains: the epoxy resin or the epoxy resin composition described above; and an inorganic filler. The inorganic filler-containing epoxy resin composition according to an embodiment may further contain other component, if necessary. Hereinafter, each component of the inorganic filler-containing epoxy resin composition will be described.

(Epoxy Resin or Epoxy Resin Composition)

The inorganic filler-containing epoxy resin composition according to an embodiment contains the epoxy resin or the epoxy resin composition described above. The inorganic filler-containing epoxy resin composition contains the epoxy resin or the epoxy resin composition, whereby fluidity and heat conductivity are improved.

The content of the epoxy resin or the epoxy resin composition in the inorganic filler-containing epoxy resin composition is not particularly limited. The content of the epoxy resin or the epoxy resin composition in the inorganic filler-containing epoxy resin composition is preferably from 3% by mass to 20% by mass, and more preferably from 5% by mass to 10% by mass, from the viewpoints of fluidity and heat conductivity.

(Inorganic Filler)

The inorganic filler-containing epoxy resin composition according to an embodiment contains at least one inorganic filler. The inorganic filler-containing epoxy resin composition contains an inorganic filler, whereby a high heat conductivity is achieved. The inorganic filler may have insulation property or electroconductivity, and the inorganic filler preferably has insulation property. Specific examples of an insulating inorganic filler include particles of boron nitride, alumina, silica, aluminum nitride, magnesium oxide, silicon oxide, aluminum hydroxide, barium sulfate, or the like. Among them, a particle of at least one selected from the group consisting of magnesium oxide and aluminum oxide is preferable from the viewpoints of fluidity, heat conductivity, and electric insulation property. The inorganic filler-containing epoxy resin composition may contain particles of boron nitride, alumina, silica, aluminum nitride, or the like, as long as fluidity is not impaired.

The inorganic filler may have a single peak or a plurality of peaks in a particle size distribution curve depicted by plotting the particle diameter on the abscissa axis and the frequency on the ordinate axis. An inorganic filler having a plurality of peaks in the particle size distribution curve depicted is used, thereby enhancing fillability of the inorganic filler and enhancing heat conductive property of a cured product.

In a case in which the inorganic filler has a single peak in the particle size distribution curve depicted, the average particle diameter (D50) corresponding to a particle diameter at 50% accumulated from the smaller particle diameter in the weight accumulation particle size distribution of the inorganic filler is preferably from 0.1 μm to 100 μm, and more preferably from 0.1 μm to 70 μm, from the viewpoint of heat conductivity. In a case in which the inorganic filler has a plurality of peaks in the particle size distribution curve, for example, a combination of two or more inorganic fillers each having a different average particle size from each other may be used.

The average particle diameter of the inorganic filler herein corresponds to the particle diameter at 50% weight-accumulated from the smaller particle diameter in the weight accumulation particle size distribution depicted in measurement with a laser diffraction method. The particle size distribution measurement by a laser diffraction method may be carried out using a laser diffraction particle size analyzer (for example, LS230 manufactured by Beckman Coulter, Inc.).

The specific surface area of an inorganic filler is mainly measured by a BET method. The BET method is a gas adsorption method in which the molecule of an inert gas such as nitrogen ($N_2$), argon (Ar) or krypton (Kr) is allowed to adsorb to a solid particle and the specific surface area of the solid particle is measured based on the amount of adsorption of the gas molecule. The specific surface area may be measured by using a specific surface area/pore distribution measurement apparatus (for example, SA3100 manufactured by Beckman Coulter, Inc.).

The content of an inorganic filler in the inorganic filler-containing epoxy resin composition is not particularly limited. The content of an inorganic filler is preferably from 60% by volume to 90% by volume, and more preferably from 70% by volume to 85% by volume, with respect to the total volume of the inorganic filler-containing epoxy resin composition being 100% by volume, from the viewpoints of heat conductivity and moldability. In a case in which the content of an inorganic filler is 60% by volume or more, heat conductivity tends to be improved. In a case in which the content of an inorganic filler is 90% by volume or less, moldability tends to be improved.

The content (% by volume) of an inorganic filler in the inorganic filler-containing epoxy resin composition herein is the value determined from the following expression.

Content (% by volume) of inorganic filler=$\{(Ew/Ed)/((Aw/Ad)+(Bw/Bd)+(Cw/Cd)+(Dw/Dd)+(Ew/Ed)+(Fw/Fd))\} \times 100$ The respective variables are as follows.
Aw: Mass composition ratio (% by mass) of epoxy resin
Bw: Mass composition ratio (% by mass) of phenol curing agent (optional component)
Cw: Mass composition ratio (% by mass) of silane coupling agent (optional component)
Dw: Mass composition ratio (% by mass) of curing accelerator (optional component)
Ew: Mass composition ratio (% by mass) of inorganic filler
Fw: Mass composition ratio (% by mass) of other component(s) (optional component)
Ad: Specific gravity of epoxy resin
Bd: Specific gravity of phenol curing agent (optional component)
Cd: Specific gravity of silane coupling agent (optional component)
Dd: Specific gravity of curing accelerator (optional component)
Ed: Specific gravity of inorganic filler
Fd: Specific gravity of other component(s) (optional component)

(Phenol Curing Agent)

The inorganic filler-containing epoxy resin composition according to an embodiment may contain a phenol curing agent. A phenol curing agent commonly used may be used therefor without any particular limitation, and a commercially available low-molecular weight phenol compound or a novolac phenol resin thereof may be used. Examples of the low-molecular weight phenol compound include: a monofunctional compound such as phenol, o-cresol, m-cresol or p-cresol; a bifunctional compound such as catechol, resorcinol or hydroquinone; and a trifunctional compound such as 1,2,3-trihydroxybenzene, 1,2,4-trihydroxybenzene or 1,3,5-trihydroxybenzene. A novolac-type phenol novolac resin of such a low-molecular weight phenol compound due to linking with a methylene chain or the like may also be used as the curing agent.

The phenol curing agent is preferably a bifunctional phenol compound such as catechol, resorcinol or hydroquinone, or a phenol novolac resin thereof in which such a bifunctional phenol compounds is bonded via a methylene chain, from the viewpoint of heat conductivity, and is more preferably a phenol novolac resin in which such a low-molecular weight bifunctional phenol compound is bonded via a methylene chain, from the viewpoint of heat resistance.

Specific examples of the phenol novolac resin include: a novolac resin of one phenol compound, such as a cresol novolac resin, a catechol novolac resin, a resorcinol novolac resin or a hydroquinone novolac resin; and a novolac resin of two or more phenol compounds, such as a catechol-resorcinol novolac resin or a resorcinol-hydroquinone novolac resin. In particular, the phenol novolac resin preferably includes a compound having a structure represented by at least one selected from the group consisting of the following Formulae (I-1) and (I-2).

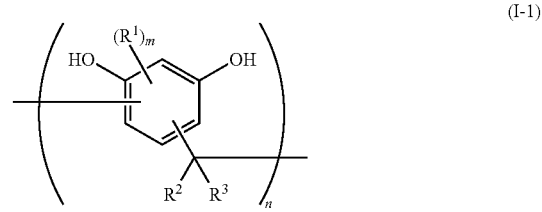

(I-1)

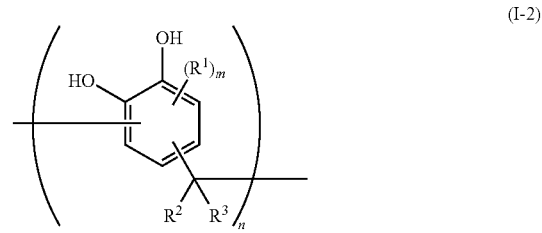

(I-2)

In Formulae (I-1) and (I-2), each $R^1$ independently represents an alkyl group, an aromatic group or an aralkyl group. The alkyl group, the aromatic group, and the aralkyl group represented by $R^1$ optionally further have a substituent. Examples of the substituent include an alkyl group, an aryl group, a halogen atom and a hydroxyl group. Each m independently represents an integer from 0 to 2, and when m represents 2, two $R^1$'s may be the same as or different from each other. Each m independently preferably represents 0 or 1, and more preferably 0. Each n independently represents an integer from 1 to 7.

In Formulae (I-1) and (I-2), each of $R^2$ and $R^3$ independently represents a hydrogen atom, an alkyl group, an aromatic group or an aralkyl group. The alkyl group, the aromatic group, and the aralkyl group represented by each of $R^2$ and $R^3$ optionally further have a substituent. Examples of the substituent include an alkyl group, an aryl group, a halogen atom and a hydroxyl group.

$R^2$ and $R^3$ in Formulae (I-1) and (I-2) each independently preferably represent a hydrogen atom, an alkyl group or an aromatic group, more preferably a hydrogen atom, an alkyl group having 1 to 4 carbon atoms or an aromatic group having 6 to 12, and still more preferably a hydrogen atom, from the viewpoints of storage stability and heat conductivity.

The compound having the structural unit represented by Formula (I-1) may further include at least one partial structure derived from a phenol compound other than resorcinol. Examples of the phenol compound other than resorcinol in Formula (I-1) include phenol, cresol, catechol, hydroquinone, 1,2,3-trihydroxybenzene, 1,2,4-trihydroxybenzene and 1,3,5-trihydroxybenzene. In an embodiment, any partial structure derived therefrom may be included singly, or in combinations of two or more kinds thereof.

Likely, the compound having the structural unit derived from catechol, represented by Formula (I-2), may further include at least one partial structure derived from a phenol compound other than catechol.

The partial structure derived from a phenol compound as used herein means a monovalent or divalent group formed by removing one or two hydrogen atoms from the benzene ring moiety of a phenol compound. The position(s) at which hydrogen atom(s) is/are removed is/are not particularly limited.

The partial structure derived from a phenol compound other than resorcinol in the compound having the structural unit represented by Formula (I-1) is preferably a partial structure derived from at least one selected from the group consisting of phenol, cresol, catechol, hydroquinone, 1,2,3-trihydroxybenzene, 1,2,4-trihydroxybenzene and 1,3,5-trihydroxybenzene, and more preferably a partial structure derived from at least one selected from the group consisting of catechol and hydroquinone, from the viewpoints of heat conductivity and adhesiveness.

The content of the partial structure derived from resorcinol in the compound having the structural unit represented by Formula (I-1) is not particularly limited. The content of the partial structure derived from resorcinol with respect to the total mass of the compound having the structural unit represented by Formula (I-1) is preferably 55% by mass or more from the viewpoint of elastic modulus. The content of the partial structure derived from resorcinol with respect to the total mass of the compound having the structural unit represented by Formula (I-1) is more preferably 60% by mass or more, and still more preferably 80% by mass or more, from the viewpoints of the glass transition temperature (Tg) and the linear expansion coefficient of a cured product, and is particularly preferably 90% by mass or more from the viewpoint of heat conductivity.

The molecular weight of the compound having a structural unit represented by at least one selected from the group consisting of Formulae (I-1) and (I-2) is not particularly limited. The number average molecular weight (Mn) thereof is preferably 2,000 or less, more preferably 1,500 or less, and still more preferably from 350 to 1,500, from the viewpoint of fluidity. The weight average molecular weight (Mw) is preferably 2,000 or less, more preferably 1,500 or less, and still more preferably from 400 to 1,500. The Mn and Mw are measured by a common method using gel permeation chromatography (GPC).

The hydroxyl equivalent of the compound having a structural unit represented by at least one selected from the group consisting of Formulae (I-1) and (I-2) is not particularly limited. An average of the hydroxyl equivalent is preferably from 50 g/eq to 150 g/eq, more preferably from 50 g/eq to 120 g/eq, and still more preferably from 55 g/eq to 120 g/eq, from the viewpoint of crosslinking density involved in heat resistance.

The phenol novolac resin preferably includes a compound having a structure represented by at least one selected from the group consisting of the following Formulae (II-1) to (II-4).

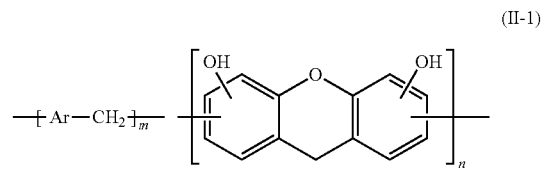
(II-1)

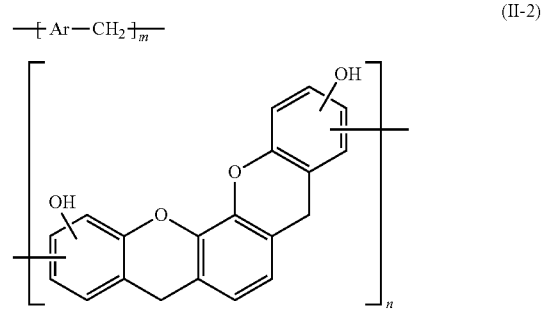
(II-2)

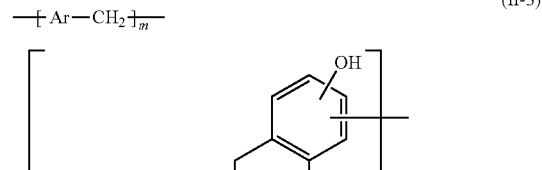
(II-3)

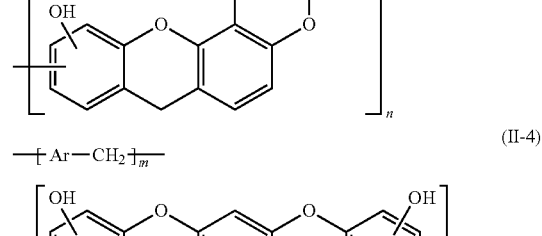
(II-4)

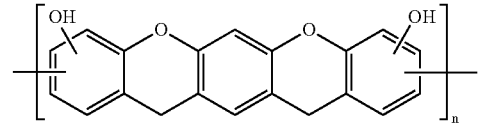

In Formulae (II-1) to (II-4), m and n each independently represent a positive integer, and mean the numbers of repeated structural units marked with m and n, respectively. Each Ar independently represents a group represented by any one of the following Formulae (II-a) and (II-b).

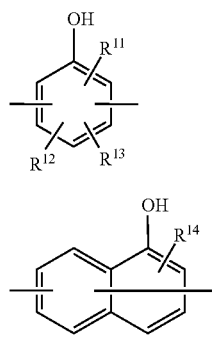

(II-a)

(II-b)

In Formulae (II-a) and (II-b), each of $R^{11}$ and $R^{14}$ independently represents a hydrogen atom or a hydroxyl group; and each of $R^{12}$ and $R^{13}$ independently represents a hydrogen atom, or an alkyl group having 1 to 8 carbon atoms.

The compound having a structure represented by at least one selected from the group consisting of Formulae (II-1) to (II-4) is a compound capable of being generated as a by-product by a method of producing a novolac compound of the divalent phenol compound.

The structure represented by at least one selected from the group consisting of Formulae (II-1) to (II-4) may be included as a main chain backbone of the phenol novolac resin, or may be included as a part of a side chain of the phenol novolac resin. Respective structural units forming the structure represented by any one of Formulae (II-1) to (II-4) may be randomly included, may be regularly included, or may be included in a block manner.

The position of substitution with a hydroxyl group in Formulae (II-1) to (II-4) is not particularly limited as long as the position is on an aromatic ring.

All of the plurality of Ar's present in each of Formulae (II-1) to (II-4) may be the same atom group, or the plurality of Ar's may include two or more atom groups. Each Ar represents a group represented by any one of Formulae (II-a) and (II-b).

Each of $R^{11}$ and $R^{14}$ in Formulae (II-a) and (II-b) independently represents a hydrogen atom or a hydroxyl group, and preferably represents a hydroxyl group from the viewpoint of heat conductivity. The position of substitution with each of $R^{11}$ and $R^{14}$ is not particularly limited.

Each of $R^{12}$ and $R^{13}$ in Formula (II-a) independently represents a hydrogen atom, or an alkyl group having 1 to 8 carbon atoms. Examples of the alkyl group having 1 to 8 carbon atoms in $R^{12}$ or $R^{13}$ include a methyl group, an ethyl group, a n-propyl group, an isopropyl group, a n-butyl group, an isobutyl group, a t-butyl group, a pentyl group, a hexyl group, a heptyl group and an octyl group. The position of substitution with each of $R^{12}$ and $R^{13}$ in Formula (II-a) is not particularly limited.

Ar in Formulae (II-1) to (II-4) preferably represents at least one selected from the group consisting of a group (group in which $R^{11}$ represents a hydroxyl group and each of $R^{12}$ and $R^{13}$ represent a hydrogen atom in Formula (II-a)) derived from dihydroxybenzene, and a group (group in which $R^{14}$ in Formula (II-b) represents a hydroxyl group) derived from dihydroxynaphthalene, from the viewpoint of achieving a more superior heat conductivity.

The "group derived from dihydroxybenzene" as used herein means a divalent group formed by removing two hydrogen atoms from the aromatic moiety of dihydroxybenzene, and the positions from which two hydrogen atoms are removed are not particularly limited. The same applies to the "group derived from dihydroxynaphthalene".

Ar more preferably represents a group derived from dihydroxybenzene, and still more preferably represents at least one selected from the group consisting of a group derived from 1,2-dihydroxybenzene (catechol) and a group derived from 1,3-dihydroxybenzene (resorcinol), from the viewpoints of productivity and fluidity of the inorganic filler-containing epoxy resin composition. It is preferable that Ar includes at least a group derived from resorcinol from the viewpoint of particularly improving heat conductivity. It is preferable that the structural unit, the number of repeating of which is represented by n, includes a group derived from resorcinol from the viewpoint of particularly improving heat conductivity. The content of the structural unit including the group derived from resorcinol with respect to the total weight of the compound having a structure represented by at least one selected from the group consisting of Formulae (II-1) to (II-4) is preferably 55% by mass or more, from the viewpoint of elastic modulus. The content of the structural unit including a group derived from resorcinol with respect to the total weight of the compound having a structure represented by at least one selected from the group consisting of Formulae (II-1) to (II-4) is more preferably 60% by mass or more, and still more preferably 80% by mass or more, from the viewpoints of the glass transition temperature (Tg) and the linear expansion coefficient of a cured product, and is particularly preferably 90% by mass or more from the viewpoint of heat conductivity.

In Formulae (II-1) to (II-4), m and n preferably satisfy m/n=20/1 to 1/5, more preferably from 20/1 to 5/1, and still more preferably from 20/1 to 10/1, from the viewpoint of fluidity. Furthermore, (m+n) is preferably 20 or less, more preferably 15 or less, and still more preferably 10 or less, from the viewpoint of fluidity. The lower limit of (m+n) is not particularly limited.

In particular, in a case in which Ar represents at least one of substituted or unsubstituted dihydroxybenzene or substituted or unsubstituted dihydroxynaphthalene, the compound having a structure represented by at least one selected from the group consisting of Formulae (II-1) to (II-4) tends to be easily synthesized and tends to provide a curing agent having a lower softening point, as compared with a simple novolac resin or the like of such dihydroxybenzene or dihydroxynaphthalene. Accordingly, an advantage is that a resin composition including such a resin is also easily produced and handled.

The presence of the above-mentioned structure as a fragment component in the compound having a structure represented by at least one selected from the group consisting of Formulae (II-1) to (II-4) may easily be identified by field desorption mass spectrometry (FD-MS).

The molecular weight of the compound having a structure represented by at least one selected from the group consisting of Formulae (II-1) to (II-4) is not particularly limited. The number average molecular weight (Mn) thereof is preferably 2,000 or less, more preferably 1,500 or less, and still more preferably from 350 to 1,500, from the viewpoint of fluidity. The weight average molecular weight (Mw) thereof is preferably 2,000 or less, more preferably 1,500 or less, and still more preferably from 400 to 1,500. The Mn and Mw are measured by a common method using gel permeation chromatography (GPC).

The hydroxyl equivalent of the compound having a structure represented by at least one selected from the group consisting of Formulae (II-1) to (II-4) is not particularly limited. An average of the hydroxyl equivalent is preferably from 50 g/eq to 150 g/eq, more preferably from 50 g/eq to 120 g/eq, and still more preferably from 55 g/eq to 120 g/eq, from the viewpoint of crosslinking density involved in heat resistance.

The phenol curing agent may include a monomer which is a phenol compound that forms the phenol novolac resin. The content (hereinafter, also referred to as "monomer content") of the monomer as the phenol compound that forms the phenol novolac resin is not particularly limited. The monomer content is preferably from 5% by mass to 80% by mass, more preferably from 15% by mass to 60% by mass, and still more preferably from 20% by mass to 50% by mass, from the viewpoints of heat conductivity and moldability. In a case in which the monomer content is 80% by mass or less, the amount of a monomer not contributing to crosslinking in a curing reaction is decreased, and the amount of crosslinkable, high-molecular-weight product is increased, whereby a higher-order structure having a higher density is formed, and heat conductivity is improved. In a case in which the monomer content is 5% by mass or more, flowing during molding easily occurs and adhesiveness with the inorganic filler is more enhanced, whereby more superior heat conductivity and heat resistance are attained.

In a case in which the inorganic filler-containing epoxy resin composition according to an embodiment contains a phenol curing agent, the content of the phenol curing agent in the inorganic filler-containing epoxy resin composition is not particularly limited. The ratio (the number of equivalents of the phenolic hydroxyl group/the number of equivalents of the epoxy group) of the number of equivalents of active hydrogen of the phenolic hydroxyl group in the phenol curing agent (the number of equivalents of the phenolic hydroxyl group) and the number of equivalents of the epoxy group in the epoxy resin or the epoxy resin composition is preferably from 0.5 to 2, and more preferably from 0.8 to 1.2.

(Curing Accelerator)

In a case in which the inorganic filler-containing epoxy resin composition according to an embodiment contains a phenol curing agent, a curing accelerator may be, if necessary, used in combination with the phenol curing agent. In a case in which the curing accelerator is used in combination with the phenol curing agent, whereby it is capable of further satisfactory curing the inorganic filler-containing epoxy resin composition. The type and the amount of the curing accelerator to be compounded are not particularly limited, and may be appropriately selected from the viewpoint of the reaction speed, the reaction temperature, storage property, or the like. Specific examples of the curing accelerator include an imidazole compound, an organic phosphorus compound, a tertiary amine and a quaternary ammonium salt. These may be used singly, or in combination of two or more kinds thereof. Among them, at least one selected from the group consisting of: an organic phosphine compound; a compound having intramolecular polarization, obtained by addition of a compound having a IT bond such as maleic anhydride, a quinone compound (such as 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, or phenyl-1,4-benzoquinone), diazophenylmethane or a phenol resin to an organic phosphine compound; and a complex of an organic phosphine compound and an organic boron compound (such as tetraphenyl borate, tetra-p-tolyl borate, or tetra-n-butyl borate) is preferable from the viewpoint of heat resistance.

Specific examples of the organic phosphine compound include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkyl phosphine, dialkyl aryl phosphine and alkyl diaryl phosphine.

In a case in which the inorganic filler-containing epoxy resin composition according to an embodiment contains a curing accelerator, the content of the curing accelerator in the inorganic filler-containing epoxy resin composition is not particularly limited. The content of the curing accelerator with respect to the total mass of the epoxy resin or epoxy resin composition and the phenol curing agent is preferably from 0.1% by mass to 1.5% by mass, and more preferably from 0.2% by mass to 1% by mass, from the viewpoints of fluidity and moldability.

(Silane Coupling Agent)

The inorganic filler-containing epoxy resin composition according to an embodiment may contain s silane coupling agent. In a case in which the inorganic filler-containing epoxy resin composition contains a silane coupling agent, the surface of the inorganic filler and an epoxy resin surrounding the inorganic filler interact with each other, whereby fluidity and heat conductivity tend to be improved, and ingress of water tends to be suppressed and insulation reliability tends to be thus improved. In particular, a silane coupling agent containing a phenyl group is expected to impart a more superior heat conductivity, because of easy interaction thereof with an epoxy resin having a mesogen backbone.

The type of the silane coupling agent containing a phenyl group is not particularly limited, and a commercially available silane coupling agent may be used. Specific examples of the silane coupling agent containing a phenyl group include 3-phenylaminopropyltrimethoxysilane, 3-phenylaminopropyltriethoxysilane, N-methylanilinopropyltrimethoxysilane, N-methylanilinopropyltriethoxysilane, 3-phenyliminopropyltrimethoxysilane, 3-phenyliminopropyltriethoxysilane, phenyltrimethoxysilane, phenyltriethoxysilane, diphenyldimethoxysilane, diphenyldiethoxysilane, triphenylmethoxysilane and triphenylethoxysilane. These silane coupling agents may be used singly, or in combination of two or more kinds thereof.

The amount of the silane coupling agent to be used is preferably set so that the coating rate (hereinafter, designated as the "coating rate of the silane coupling agent") with respect to the total surface area of the inorganic filler is from 0.4 to 0.8. The coating rate is calculated from the following expression.

Coating rate of silane coupling agent={Minimum coating area ($m^2$/g) of silane coupling agent×Amount (g) of silane coupling agent to be used}/{Specific surface area ($m^2$/g) of inorganic filler×Amount (g) of inorganic filler to be used}

The minimum coating area of the silane coupling agent in the above expression is calculated from the following expression.

Minimum coating area ($m^2$/g) of silane coupling agent={Avogadro constant ($6.02 \times 10^{23}$) ($mol^{-1}$)×Coating area ($13 \times 10^{-20}$) ($m^2$) per molecule of silane coupling agent}/Molecular weight (g/mol) of silane coupling agent The coating rate of the silane coupling agent, determined by the above expression, is 1 in a case in which the entire surface of the inorganic filler is coated with the silane coupling agent. In such a case, the unreacted silane coupling agent which does not react with the inorganic filler may be generated because a polar group such as a hydroxyl group is not present, in some cases, on the surface of the inorganic filler in such an amount as to react with the silane coupling agent. Therefore, in a case in which the coating rate of the silane coupling agent is more than 0.8, a silane coupling agent not reacting with the inorganic filler may inhibit binding of the inorganic filler and the epoxy resin, and/or crosslinking of the epoxy resin, thereby deteriorating heat conductivity. In a case in which the coating rate of the silane coupling agent is less than 0.4, molding failure such as the occurrence of voids tends to easily occur. Accordingly, the coating rate of the silane coupling agent is preferably from 0.4 to 0.8, and more preferably from 0.5 to 0.7.

The method of adding the silane coupling agent to the inorganic filler-containing epoxy resin composition is not particularly limited. Specific addition methods include an integral method in which a silane coupling agent is added during mixing of other materials such as the epoxy resin and the inorganic filler; a master batch method in which a predetermined amount of the silane coupling agent is mixed with a small amount of the epoxy resin, and thereafter the resulting mixture is mixed with other materials such as the inorganic filler; and a pretreatment method in which the silane coupling agent is mixed with the inorganic filler in advance, to treat the surface of the inorganic filler, and thereafter the resultant is mixed with other materials such as the epoxy resin. The pretreatment method is classified into: a dry method in which an undiluted solution or a solution of the silane coupling agent is stirred together with the inorganic filler at a high speed, thereby providing uniform dispersion; and a wet method in which the surface of the inorganic filler is treated by forming a diluted solution of the silane coupling agent into a slurry or directly immersing the inorganic filler in the diluted solution.

(Other Component)

The inorganic filler-containing epoxy resin composition according to an embodiment may contain, if necessary, a release agent. Examples of the release agent include an oxidized or non-oxidized polyolefin, carnauba wax, a montanic acid ester, montanic acid and stearic acid. These release agents may be used singly, or in combination of two or more kinds thereof.

The inorganic filler-containing epoxy resin composition according to an embodiment may contain, if necessary, a stress releaser such as silicone oil or a silicone rubber powder, a reinforcing agent such as glass fiber, or the like.

(Method of Preparing Inorganic Filler-Containing Epoxy Resin Composition)

The method of preparing the inorganic filler-containing epoxy resin composition according to an embodiment may be any method as long as it is capable of uniformly disperse and mix the respective components. As a general method, a method is employed in which predetermined amounts of components are satisfactory mixed using a mixer or the like, thereafter melt-kneaded using a mixing roll, an extruder, or the like, followed by cooling and pulverizing. For example, a method in which predetermined amounts of the above-mentioned components are stirred and mixed, kneaded using a kneader, a roll, an extruder or the like heated to a temperature of from 70° C. to 140° C. in advance, followed by cooling and pulverizing, thereby providing a molding material which is the inorganic filler-containing epoxy resin composition. A highly heat-conductive resin composition is easily used which is formed into a tablet so as to have a dimension and a mass adapted to molding conditions.

(Heat Conductivity of Inorganic Filler-Containing Epoxy Resin Composition)

The inorganic filler-containing epoxy resin composition according to an embodiment preferably has a heat conductivity of 7 W/(m·K) or more when the epoxy resin composition is formed into a cured product.

The method of curing the inorganic filler-containing epoxy resin composition according to an embodiment is not particularly limited. For example, a cured product may be obtained by heating the composition at a temperature of from 100° C. to 250° C. for a period of from 1 hour to 10 hours, and preferably at a temperature of from 130° C. to 230° C. for a period of from 1 hour to 8 hours. The inorganic filler-containing epoxy resin composition according to an embodiment may also be cured by a transfer molding method, a compression molding method, or the like, as described below.

The heat conductivity of the cured product may be determined from the product of the thermal diffusivity of the cured product, measured by a laser flash method, and the specific heat and the specific gravity of the cured product. The thermal diffusivity may be measured using a thermal diffusivity measurement apparatus (for example, LFA447 manufactured by NETZSCH).

<Resin Sheet>

A resin sheet according to an embodiment of the invention is a sheet-like molded article of the inorganic filler-containing epoxy resin composition, and may further include, if necessary, a substrate. The resin sheet may be produced by: adding an organic solvent capable of dissolving the epoxy resin in the inorganic filler-containing epoxy resin composition to the inorganic filler-containing epoxy resin composition, to prepare a coating liquid; coating a substrate with the coating liquid to form a coating layer; and removing the organic solvent by heating and drying.

The type of the substrate is not particularly limited. Examples of the type of the substrate include a polyethylene terephthalate (PET) film, an aluminum foil and a copper foil. The thickness of the substrate is not particularly limited, and may be, for example, from 25 μm to 100 μm.

The substrate may be coated with the coating liquid by a known method. Specific examples of the coating method include comma coating, die coating, lip coating, and gravure coating methods.

The thickness of the sheet-like molded article (hereinafter, also referred to as "resin layer") of the inorganic filler-containing epoxy resin composition to be formed on a substrate is not particularly limited, and may be, if appropriate, selected depending on the intended use. For example, the thickness of a resin layer is preferably from 50 μm to 500 μm, and more preferably from 100 μm to 300 μm.

The resin sheet according to an embodiment may be used as, for example, an adhesive sheet. In a common usage method, a resin sheet includes a substrate, and the substrate is removed after the resin layer is bonded to an adherend.

<Cured Product>

A cured product according to an embodiment of the invention is obtained by curing the inorganic filler-containing epoxy resin composition or the resin sheet.

The method of curing the inorganic filler-containing epoxy resin composition is not particularly limited. For example, the cured product may be obtained by heating the composition at a temperature of from 100° C. to 250° C. for a period of from 1 hour to 10 hours, and preferably at a temperature of from 130° C. to 230° C. for a period of from 1 hour to 8 hours.

The inorganic filler-containing epoxy resin composition may also be cured by a transfer molding method, a compression molding method, or the like. For example, in a case of transfer molding, a cured product is obtained by heating the composition at a mold temperature of from 140° C. to 180° C. and a molding pressure of from 10 MPa to 25 MPa for a period of from 30 seconds to 600 seconds. If necessary, the cured product, released from the mold, may be post-cured by further heating it at a temperature of from 160° C. to 200° C. for a period of from 2 hours to 8 hours.

The method of curing the resin sheet is not particularly limited, and is preferably a heating and pressurizing treatment. For example, the cured product may be obtained by heating the resin sheet at a temperature of from 100° C. to 250° C. for a period of from 1 hour to 10 hours under a pressure of from 1 MPa to 20 MPa, and preferably at a temperature of from 130° C. to 230° C. for a period of from 1 hour to 8 hours under a pressure of from 1 MPa to 15 MPa. If necessary, the cured product may be post-cured by further heating it at a temperature of from 160° C. to 200° C. for a period of from 2 hours to 8 hours after the pressurizing and curing treatment.

The cured product according to an embodiment preferably has a diffraction peak in a range of diffraction angle $2\theta=3.0°$ to $3.5°$ by an X-ray diffraction method using CuKα rays. A cured product having such a diffraction peak has a higher-order structure (smectic phase) of the resin, and is excellent in heat conductivity.

The detail of the X-ray diffraction measurement using CuKα rays as used herein is as follows.

[Measurement Conditions]

Apparatus used: X-ray diffractometer for thin film structure evaluation, ATX-G (manufactured by Rigaku Corporation)

Type of X-ray: CuKα
Scanning mode: $2\theta/\omega$
Output: 50 kV, 300 mA
S1 slit: width: 0.2 mm, height: 10 mm
S2 slit: width: 0.2 mm, height: 10 mm
RS slit: width: 0.2 mm, height: 10 mm
Measurement range: $2\theta=2.0°$ to $4.5°$
Sampling width: 0.01°

<Epoxy Compound>

An epoxy compound according to an embodiment of the invention is represented by the following Formula (1).

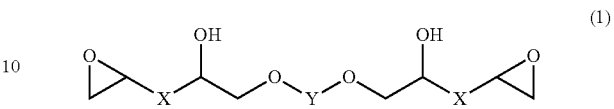

In Formula (1), each X independently represents a divalent group having a mesogen backbone, and Y represents a phenylene group optionally having a substituent. Examples of the optional substituent in Y include an alkyl group having 1 to 8 carbon atoms.

The epoxy compound represented by Formula (1) may be obtained by, for example, reacting the epoxy resin monomer having a mesogen backbone and having two glycidyl groups in a molecule thereof with the divalent phenol compound having, as substituents, two hydroxyl groups on a benzene ring thereof. In this case, X in Formula (1) here corresponds to a partial structure excluding epoxy groups derived from two glycidyl groups of the epoxy resin monomer. Y in Formula (1) corresponds to a partial structure excluding two hydroxyl groups of the divalent phenol compound.

X in Formula (1) preferably represents a partial structure excluding epoxy groups derived from two glycidyl groups of 4-{4-(2,3-epoxypropoxy)phenyl}cyclohexyl 4-(2,3-epoxypropoxy)benzoate, and more preferably represents a partial structure excluding epoxy groups derived from two glycidyl groups of trans-4-{4-(2,3-epoxypropoxy)phenyl}cyclohexyl 4-(2,3-epoxypropoxy)benzoate, from the viewpoint of improving heat conductivity. Y in Formula (1) preferably represents a partial structure excluding two hydroxyl groups of catechol, resorcinol or hydroquinone. That is, the epoxy compound according to an embodiment is preferably a compound represented by at least one of the following Formulae (2-1) to (2-3), and more preferably a compound represented by at least one of the following Formulae (2-a) to (2-c).

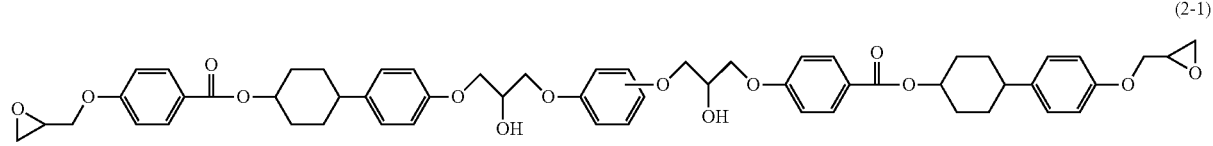

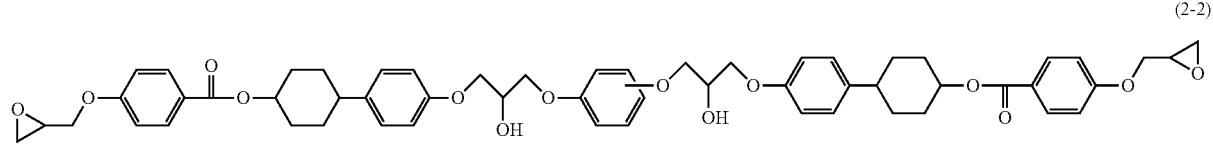

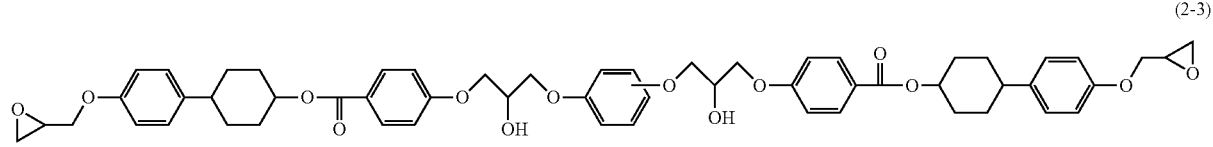

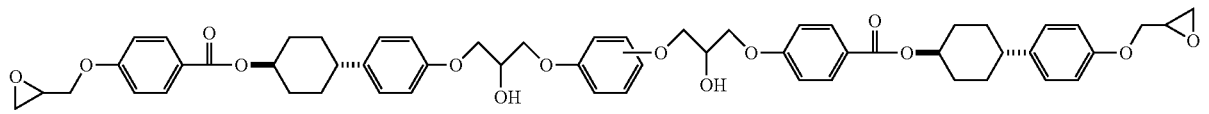

(2-a)

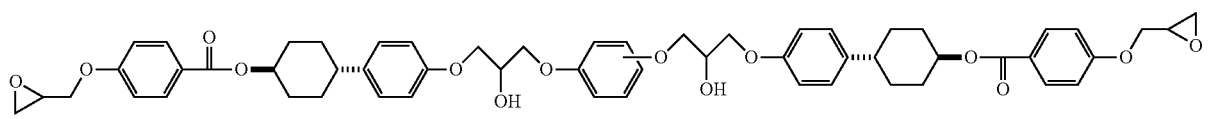

(2-b)

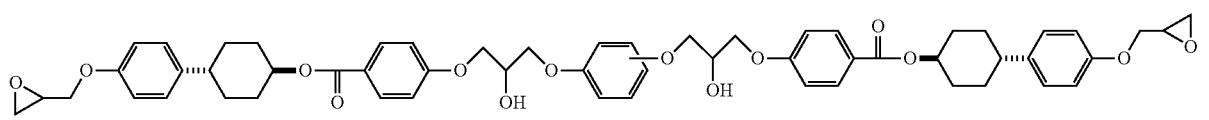

(2-c)

Three isomers different in substitution position on the benzene ring of Y in Formula (1) are present in respective epoxy compounds represented by Formulae (2-1) to (2-3) and Formulae (2-a) to (2-c).

For example, in a case in which Y in Formula (1) represents a partial structure derived from hydroquinone, the epoxy compounds represented by Formulae (2-1) to (2-3) and Formulae (2-a) to (2-c) are represented by the following Formulae (3-1) to (3-3) and the following Formulae (3-a) to (3-c), respectively.

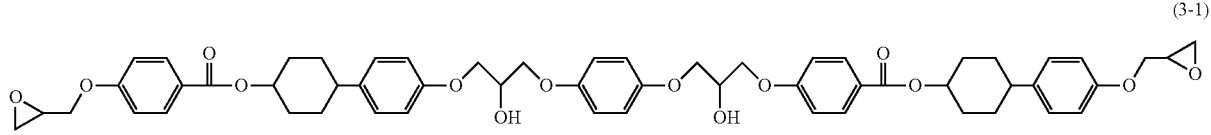

(3-1)

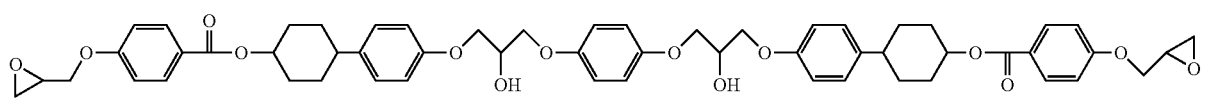

(3-2)

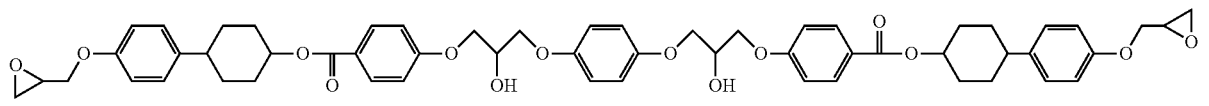

(3-3)

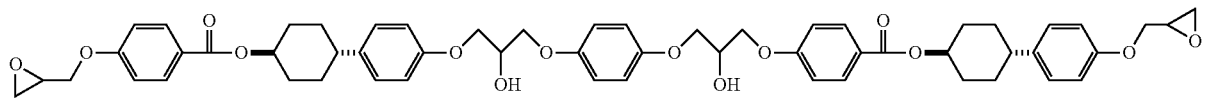

(3-a)

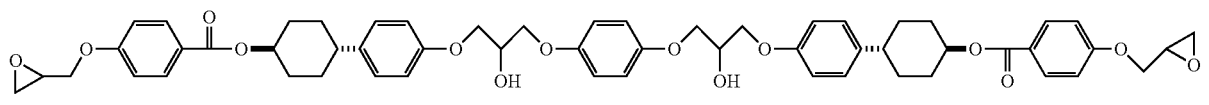

(3-b)

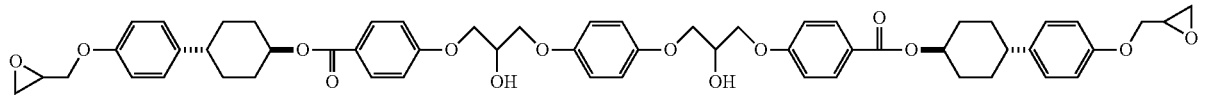

(3-c)

In a case in which Y in Formula (1) represents a partial structure derived from resorcinol, the epoxy compounds represented by Formulae (2-1) to (2-3) and Formulae (2-a) to (2-c) are represented by the following Formulae (4-1) to (4-3) and the following Formulae (4-a) to (4-c), respectively.
(4-1)
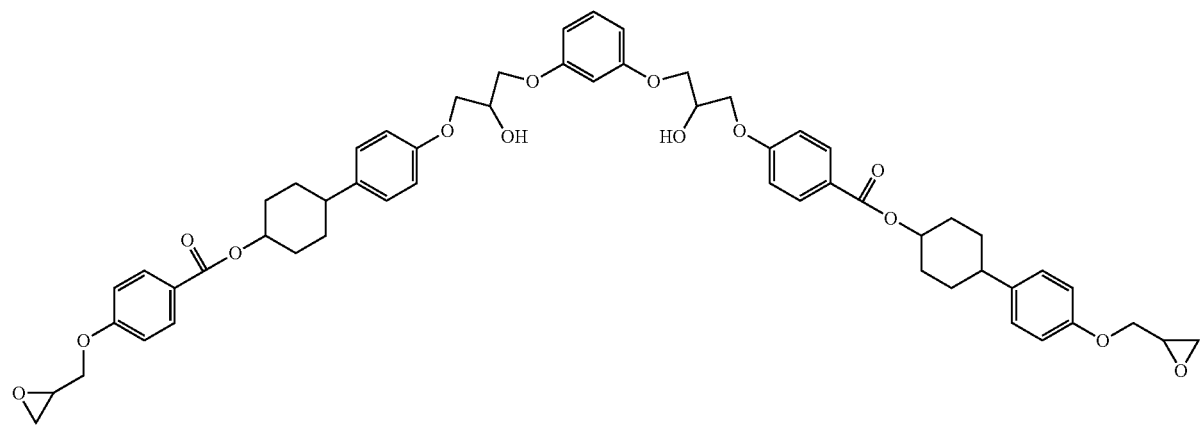
(4-2)
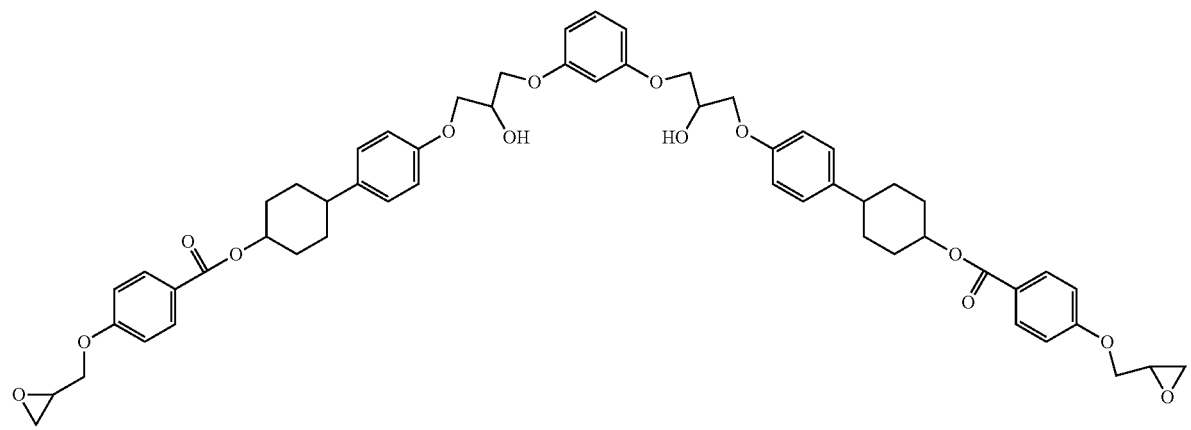
(4-3)
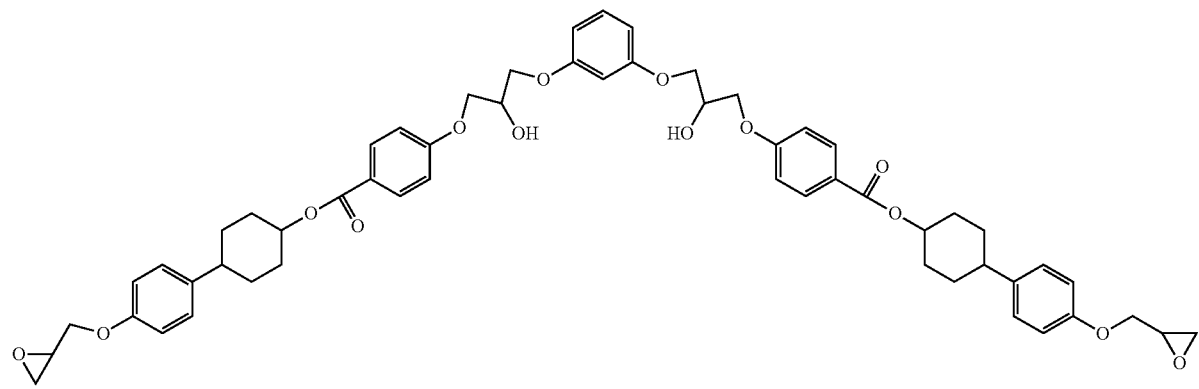

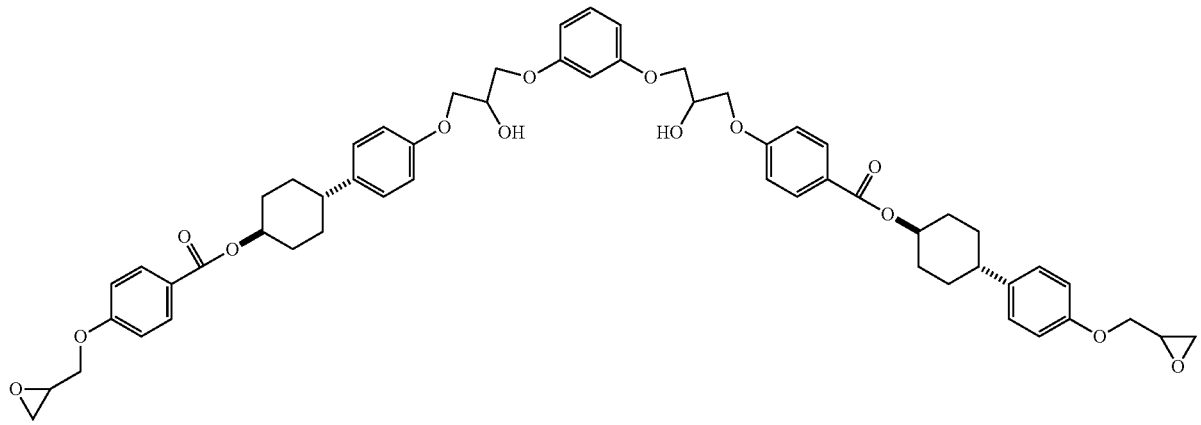

(4-a)

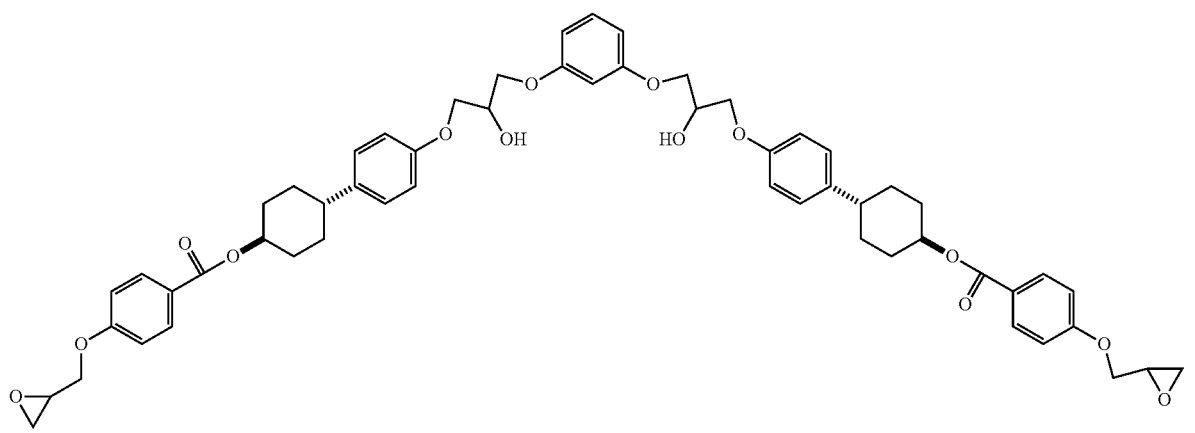

(4-b)

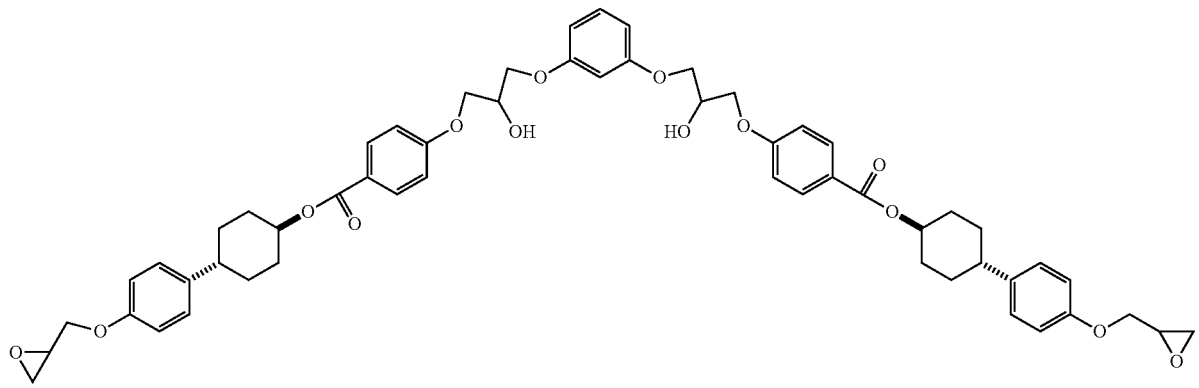

(4-c)

In particular, the epoxy compound is preferably a compound represented by at least one of Formulae (3-1) to (3-3), and more preferably a compound represented by at least one of Formulae (3-a) to (3-c). The respective epoxy compounds represented by Formulae (3-1) to (3-3) and Formulae (3-a) to (3-c) have a linear structure, and thus have high molecular stacking characteristics, easily form a higher-order structure, and therefore tend to allow heat conductivity to be enhanced.

<Inorganic Filler-Containing Epoxy Resin Composition>

An inorganic filler-containing epoxy resin composition according to another embodiment of the invention contains: the epoxy compound represented by Formula (1); and an inorganic filler. Hereinafter, each component of the inorganic filler-containing epoxy resin composition will be described.

(Epoxy Compound)

The inorganic filler-containing epoxy resin composition contains the epoxy compound represented by Formula (1). The inorganic filler-containing epoxy resin composition contains the epoxy compound represented by Formula (1), whereby fluidity and heat conductivity are improved.

The content of the epoxy compound represented by Formula (1) in the inorganic filler-containing epoxy resin composition is not particularly limited. The content of the epoxy compound represented by Formula (1) in the inorganic filler-containing epoxy resin composition is preferably from 1% by mass to 50% by mass, and more preferably from 5% by mass to 30% by mass, from the viewpoints of fluidity and heat conductivity.

The inorganic filler-containing epoxy resin composition according to an embodiment may contain, in addition to the epoxy compound represented by Formula (1), an epoxy resin monomer having a mesogen backbone and having two glycidyl groups in a molecule thereof, or may further contain an epoxy resin obtained by reacting the epoxy resin monomer with a divalent phenol compound having, as substituents, two hydroxyl groups on a benzene ring thereof.

(Inorganic Filler)

The inorganic filler-containing epoxy resin composition according to an embodiment contains at least one inorganic filler. Examples of the inorganic filler include those as exemplified with respect to the above-mentioned inorganic filler-containing epoxy resin composition.

The content of the inorganic filler in the inorganic filler-containing epoxy resin composition is not particularly limited. The content of the inorganic filler is preferably from 60% by volume to 90% by volume, more preferably from 70% by volume to 85% by volume, with respect to the total volume of the inorganic filler-containing epoxy resin composition being 100% by volume, from the viewpoint of heat conductivity.

(Other Component)

The inorganic filler-containing epoxy resin composition according to an embodiment may further contain other component(s) such as a phenol curing agent, a curing accelerator, a silane coupling agent, or a release agent, as in the above-mentioned inorganic filler-containing epoxy resin composition.

<Cured Product>

A cured product according to another embodiment of the invention is obtained by curing the above-mentioned epoxy compound or the above-mentioned inorganic filler-containing epoxy resin composition.

The method of curing the epoxy compound or the inorganic filler-containing epoxy resin composition is not particularly limited. For example, a cured product may be obtained by heating the epoxy compound or the inorganic filler-containing epoxy resin composition at a temperature of from 100° C. to 250° C. for a period of 1 hour to 10 hours, and preferably at a temperature of 130° C. to 230° C. for a period of 1 hour to 8 hours.

EXAMPLES

Hereinafter, the invention will be described in detail with reference to Examples, but the invention is not intended to be limited to these Examples. Unless especially noted, "part(s)" and "%" are on the mass basis.

Materials used for synthesis of each epoxy resin and abbreviations thereof are shown below.

Epoxy Resin monomer 1
Product name: ME21 (trans-4-{4-(2,3-epoxypropoxy) phenyl}cyclohexyl 4-(2,3-epoxypropoxy)benzoate, manufactured by Sumitomo Chemical Co., Ltd., see Japanese Patent No. 5471975, epoxy equivalent: 212 g/eq)

Epoxy Resin monomer 2
Product name: YL6121H (a mixture of a compound where R in the following formula represents a hydrogen atom and a compound where R in the following formula represents a methyl group in a mass ratio of about 1:1, manufactured by Mitsubishi Chemical Co., Ltd., epoxy equivalent: 172 g/eq)

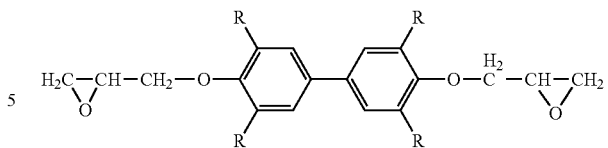

Phenol Compound 1
Compound name: hydroquinone (hydroxyl equivalent: 55 g/eq)

Phenol Compound 2
Compound name: resorcinol (hydroxyl equivalent: 55 g/eq)

Synthesis Solvent 1
cyclohexanone (boiling temperature: 156° C.)

Curing catalyst 1
triphenyl phosphine (manufactured by HOKKO CHEMICAL INDUSTRY CO., LTD., molecular weight: 262)

Example 1

[Synthesis of Epoxy Resin]

Epoxy resin monomer 1 (ME21) (50 g (0.118 mol)) was weighed and loaded into a 500-mL three-necked flask, and 80 g of synthesis solvent 1 (cyclohexanone) was added thereto. The three-necked flask was attached with a cooling tube and a nitrogen introduction tube, and a stirring blade was installed thereinto so as to be immersed in the solvent. The three-necked flask was immersed in an oil bath at 160° C., and stirring was initiated. After it was confirmed that epoxy resin monomer 1 was dissolved and a clear solution was obtained after several minutes, 0.91 g (0.0083 mol) of phenol compound 1 (hydroquinone) was added into the flask, 0.5 g of curing catalyst 1 (triphenyl phosphine) was further added thereto, and the resultant was continuously heated at an oil bath temperature of 160° C. After heating was continued for 5 hours, the residue obtained by distilling off cyclohexanone from the reaction solution under reduced pressure was cooled to room temperature, thereby providing epoxy resin 1. Epoxy resin 1 included a part of the synthesis solvent, and the unreacted epoxy resin monomer.

The solid content of epoxy resin 1 was measured by a heating loss method, and was 96.9%. The solid content was calculated by the following expression based on the amount of epoxy resin 1 measured after 1.0 g to 1.1 g of epoxy resin 1 was weighed and loaded into an aluminum cup and left to stand for 30 minutes in a dryer set at a temperature of 180° C., and the amount thereof before the heating.

Solid content (%)=(Amount measured after standing for 30 minutes/Amount measured before heating)×100

The number average molecular weight of epoxy resin 1 was measured by gel permeation chromatography (GPC), and the number average molecular weight of a polymer component newly produced by the synthesis was 1,210 and the number average molecular weight of a portion including the unreacted epoxy resin monomer was 494.

The epoxy equivalent of epoxy resin 1 was measured by a perchloric acid titration method, and was 241 g/eq.

The softening temperature of epoxy resin 1 was measured by a ring-and-ball method, and was from 90° C. to 100° C.

The temperature at which transition from a crystal phase to a liquid crystal phase of epoxy resin 1 occurred was measured with a differential scanning calorimetry (DSC) measurement apparatus, and was 138° C. The temperature at which transition from a crystal phase to a liquid crystal phase of epoxy resin 1 occurred was measured by a differential scanning calorimetry (DSC) measurement apparatus PYRIS 1 (manufactured by PerkinElmer Co., Ltd.). Specifically, the temperature was measured as a temperature at which any energy change (endothermic reaction) in accordance with a phase transition reaction occurred during a differential scanning calorimetry measurement of 3 mg to 5 mg of an epoxy resin sample enclosed in an aluminum pan under conditions of a temperature increase rate of 20° C./min, a measurement temperature range from 25° C. to 350° C., and a nitrogen flow rate of 20±5 mL/min in a nitrogen atmosphere.

Epoxy resin 1 was analyzed by area conversion using gel permeation chromatography (GPC), and as a result, it was confirmed that the resin included a compound represented by at least one of Formulae (3-a) to (3-c). The total content of the compound represented by at least one of Formulae (3-a) to (3-c) was 8.7% with respect to the total amount of epoxy resin 1.

[Preparation and Molding of Molding Material]

The following components were roll-kneaded under conditions of a kneading temperature of from 60° C. to 90° C. and a kneading time of 10 minutes, followed by cooling and pulverizing, thereby preparing a molding material which was a highly heat-conductive resin composition. The content of the inorganic filler in the molding material was 78% by volume.

(Epoxy Resin)
Epoxy resin 1 . . . 29.25 g
(Inorganic Filler)
Magnesium oxide filler (PYROKISUMA 3350, manufactured by Kyowa Chemical Industry Co., Ltd., average particle diameter: 50 µm, BET specific surface area: 0.1 $m^2/g$) . . . 320.30 g
Magnesium oxide filler (PYROKISUMA 3320, manufactured by Kyowa Chemical Industry Co., Ltd., average particle diameter: 20 µm, BET specific surface area: 0.2 $m^2/g$) 91.50 g
Magnesium oxide filler (STARMAG SL, manufactured by Konoshima Chemical Co., Ltd., average particle diameter: 8 µm, BET specific surface area: 1 $m^2/g$) . . . 45.75 g
(Phenol Curing Agent)
Phenol novolac curing agent (A-4SM, manufactured by Hitachi Chemical Co., Ltd.) . . . 7.90 g
(Curing Accelerator)
Triphenyl phosphine (manufactured by HOKKO CHEMICAL INDUSTRY CO., LTD.) . . . 0.15 g
(Silane Coupling Agent)
Diphenyldimethoxysilane (KBM-202SS, manufactured by Shin-Etsu Chemical Co., Ltd., molecular weight: 244) . . . 0.15 g
(Release Agent)
Montanic acid ester (LICOWAX E, manufactured by Clariant) . . . 5.00 g The molding material thus prepared was subjected to molding with a mold for spiral flow measurement according to EMMI-1-66 using a transfer molding machine under conditions of a mold temperature of 180° C., a molding pressure of 22.5 MPa and a curing time of 300 seconds, and the distance of flow was determined. The distance of flow was 50 cm.

Also, the molding material thus prepared was subjected to transfer molding under conditions of a mold temperature of 140° C., a molding pressure of 22.5 MPa and a curing time of 300 seconds, whereby a mold-shaped cured product was obtained. The cured product after transfer molding was post-cured by further heating at 180° C. for 4 hours.

The specific gravity of the cured product, measured by an Archimedes method, was 3.00, and the glass transition temperature of the cured product, measured by differential scanning calorimetry (DSC) measurement, was 180° C.

The thermal diffusivity of the cured product was measured by a laser flash method using a thermal diffusivity measurement apparatus (LFA447 manufactured by NETZSCH). The heat conductivity of the cured product was determined from the product of the resulting thermal diffusivity, and the specific heat and the specific gravity of the cured product, separately measured. As a result, the heat conductivity of the cured product was 11.6 W/(m·K).

The cured product was analyzed by an X-ray diffraction method using Cuk$\alpha$ rays, and it was confirmed that the cured product formed a smectic phase, and had a diffraction peak in a range of diffraction angle 2θ=3.0° to 3.5°.

Example 2

[Synthesis of Epoxy Resin]

Epoxy resin 2 was obtained in the same manner as in Example 1 except that the amount of phenol compound 1 (hydroquinone) to be added was changed to 1.3 g (0.0118 mol). Epoxy resin 2 included a part of the synthesis solvent, and the unreacted epoxy resin monomer.

The solid content of epoxy resin 2 was measured by a heating loss method, and was 96.3%.

The number average molecular weight of epoxy resin 2 was measured by gel permeation chromatography (GPC), and the number average molecular weight of a polymer component newly produced by the synthesis was 1,315, and the number average molecular weight of a portion including the unreacted epoxy resin monomer was 531.

The epoxy equivalent of epoxy resin 2 was measured by a perchloric acid titration method, and was 256 g/eq.

The softening temperature of epoxy resin 2 was measured by a ring-and-ball method, and was from 75° C. to 80° C.

The temperature at which transition from a crystal phase to a liquid crystal phase of epoxy resin 2 occurred was measured using a differential scanning calorimetry (DSC) measurement apparatus, and was 136° C.

Epoxy resin 2 was analyzed by area conversion using gel permeation chromatography (GPC), and as a result, it was confirmed that the resin included a compound represented by at least one of Formulae (3-a) to (3-c). The total content of the compound represented by at least one of Formulae (3-a) to (3-c) was 12.3% with respect to the total amount of epoxy resin 2.

[Preparation and Molding of Molding Material]

Epoxy resin 2 was used instead of epoxy resin 1. A molding material which was a highly heat-conductive resin composition was prepared in the same manner as in Example 1 except that the amount of epoxy resin 2 to be added was changed to 29.55 g and the amount of the phenol curing agent to be added was changed to 7.60 g.

The distance of flow in spiral flow was determined in the same manner as in Example 1 by using the molding material thus prepared, and was 58 cm.

Also, the molding material thus prepared was subjected to transfer molding in the same manner as in Example 1, whereby a mold-shaped cured product was obtained. The cured product after transfer molding was post-cured by further heating at 180° C. for 4 hours.

The specific gravity, the glass transition temperature and the heat conductivity of the cured product were determined in the same manner as in Example 1. The specific gravity was 3.00, the glass transition temperature was 182° C., and the heat conductivity was 11.6 W/(m·K).

The cured product was analyzed by an X-ray diffraction method using Cukα rays, and it was confirmed that the cured product formed a smectic phase, and had a diffraction peak in a range of diffraction angle 2θ=3.0° to 3.5°.

Example 3

[Synthesis of Epoxy Resin]

Epoxy resin 3 was obtained in the same manner as in Example 1 except that the amount of phenol compound 1 (hydroquinone) to be added was changed to 1.95 g (0.0176 mol). Epoxy resin 3 included a part of the synthesis solvent, and the unreacted epoxy resin monomer.

The solid content of epoxy resin 3 was measured by a heating loss method, and was 97.1%.

The number average molecular weight of epoxy resin 3 was measured by gel permeation chromatography (GPC), and the number average molecular weight of a polymer component newly produced by the synthesis was 1,520, and the number average molecular weight of a portion including the unreacted epoxy resin monomer was 583.

The epoxy equivalent of epoxy resin 3 was measured by a perchloric acid titration method, and was 263 g/eq.

The softening temperature of epoxy resin 3 was measured by a ring-and-ball method, and was from 30° C. to 35° C.

The temperature at which transition from a crystal phase to a liquid crystal phase of epoxy resin 3 occurred was measured with a differential scanning calorimetry (DSC) measurement apparatus, and was 128° C.

Epoxy resin 3 was analyzed by area conversion using gel permeation chromatography (GPC), and as a result, it was confirmed that the resin included a compound represented by at least one of Formulae (3-a) to (3-c). The total content of the compound represented by at least one of Formulae (3-a) to (3-c) was 18.2% with respect to the total amount of epoxy resin 3.

[Preparation and Molding of Molding Material]

Epoxy resin 3 was used instead of epoxy resin 1. A molding material which was a highly heat-conductive resin composition was prepared in the same manner as in Example 1 except that the amount of epoxy resin 3 to be added was changed to 29.90 g, and the amount of the phenol curing agent to be added was changed to 7.25 g.

The distance of flow in spiral flow was determined in the same manner as in Example 1 by using the molding material thus prepared, and was 66 cm.

The molding material thus prepared was subjected to transfer molding in the same manner as in Example 1, whereby a mold-shaped cured product was obtained. The cured product after transfer molding was post-cured by further heating at 180° C. for 4 hours.

The specific gravity, the glass transition temperature and the heat conductivity of the cured product were determined in the same manner as in Example 1. The specific gravity was 3.00, the glass transition temperature was 180° C., and the heat conductivity was 11.5 W/(m·K).

The cured product was analyzed by an X-ray diffraction method using Cukα rays, and it was confirmed that the cured product formed a smectic phase, and had a diffraction peak in a range of diffraction angle 2θ=3.0° to 3.5°.

Example 4

[Synthesis of Epoxy Resin]

Epoxy resin 4 was obtained in the same manner as in Example 1 except that 1.3 g (0.0118 mol) of phenol compound 2 (resorcinol) was used instead of 0.91 g (0.0083 mol) of phenol compound 1 (hydroquinone). Epoxy resin 4 included a part of the synthesis solvent, and the unreacted epoxy resin monomer.

The solid content of epoxy resin 4 was measured by a heating loss method, and was 96.4%.

The number average molecular weight of epoxy resin 4 was measured by gel permeation chromatography (GPC), and the number average molecular weight of a polymer component newly produced by the synthesis was 1,303, and the number average molecular weight of a portion including the unreacted epoxy resin monomer was 536.

The epoxy equivalent of epoxy resin 4 was measured by a perchloric acid titration method, and was 256 g/eq.

The softening temperature of epoxy resin 4 was measured by a ring-and-ball method, and was from 70° C. to 75° C.

The temperature at which transition from a crystal phase to a liquid crystal phase of epoxy resin 4 occurred was measured with a differential scanning calorimetry (DSC) measurement apparatus, and was 135° C.

Epoxy resin 4 was analyzed by area conversion using gel permeation chromatography (GPC), and as a result, it was confirmed that the resin included a compound represented by at least one of Formulae (4-a) to (4-c). The total content of the compound represented by at least one of Formulae (4-a) to (4-c) was 12.3% with respect to the total amount of epoxy resin 4.

[Preparation and Molding of Molding Material]

Epoxy resin 4 was used instead of epoxy resin 1. A molding material which was a highly heat-conductive resin composition was prepared in the same manner as in Example 1 except that the amount of epoxy resin 4 to be added was changed to 29.55 g, and the amount of the phenol curing agent to be added was changed to 7.60 g.

The distance of flow in spiral flow was determined in the same manner as in Example 1 by using the molding material thus prepared, and was 66 cm.

The molding material thus prepared was subjected to transfer molding in the same manner as in Example 1, whereby a mold-shaped cured product was obtained. The cured product after transfer molding was post-cured by further heating at 180° C. for 4 hours.

The specific gravity, the glass transition temperature and the heat conductivity of the cured product were determined in the same manner as in Example 1. The specific gravity was 3.00, the glass transition temperature was 170° C., and the heat conductivity was 10.5 W/(m·K).

The cured product was analyzed by an X-ray diffraction method using Cukα rays, and it was confirmed that the cured product formed a smectic phase, and had a diffraction peak in a range of diffraction angle 2θ=3.0° to 3.5°.

Example 5

[Preparation and Molding of Molding Material]

Epoxy resin 2 and a triphenylmethane type epoxy resin (EPPS-502H, manufactured by Nippon Kayaku Co., Ltd.) were used instead of epoxy resin 1. A molding material which was a highly heat-conductive resin composition was prepared in the same manner as in Example 1 except that the amount of epoxy resin 2 to be added was changed 17.11 g, the amount of the triphenylmethane type epoxy resin (EPPN-502H, manufactured by Nippon Kayaku Co., Ltd.) to be added was 11.36 g, and the amount of the phenol curing agent to be added was changed to 8.68 g.

The distance of flow in spiral flow was determined in the same manner as in Example 1 by using the molding material thus prepared, and was 63 cm.

Also, the molding material thus prepared was subjected to transfer molding in the same manner as in Example 1, whereby a mold-shaped cured product was obtained. The cured product after transfer molding was post-cured by further heating at 180° C. for 4 hours.

The specific gravity, the glass transition temperature and the heat conductivity of the cured product were determined in the same manner as in Example 1. The specific gravity was 3.00, the glass transition temperature was 185° C., and the heat conductivity was 10.3 W/(m·K).

The cured product was analyzed by an X-ray diffraction method using Cukα rays, and it was confirmed that the cured product formed a nematic phase.

Example 6

[Synthesis of Epoxy Resin]

Epoxy resin 6 was obtained in the same manner as in Example 1 except that 40.6 g (0.118 mol) of epoxy resin monomer 2 (YL6121H) was used instead of 50 g (0.118 mol) of epoxy resin monomer 1 (ME21) and the amount of phenol compound 1 (hydroquinone) to be added was changed to 1.3 g (0.0118 mol). Epoxy resin 6 included a part of the synthesis solvent, and the unreacted epoxy resin monomer.

The solid content of epoxy resin 6 was measured by a heating loss method, and was 97.2%.

The number average molecular weight of epoxy resin 6 was measured by gel permeation chromatography (GPC), and the number average molecular weight of a polymer component newly produced by the synthesis was 1,102, and the number average molecular weight of a portion including the unreacted epoxy resin monomer was 496.

The epoxy equivalent of epoxy resin 6 was measured by a perchloric acid titration method, and was 196 g/eq.

The softening temperature of epoxy resin 6 was measured by a ring-and-ball method, and was 30° C. or less.

The temperature at which transition from a crystal phase to a liquid crystal phase of epoxy resin 6 occurred was measured with a differential scanning calorimetry (DSC) measurement apparatus, and no clear endothermic peak derived from melting was observed because deterioration in crystallinity was remarkable.

[Preparation and Molding of Molding Material]

A molding material which was a highly heat-conductive resin composition was prepared in the same manner as in Example 1 except that epoxy resin 6 was used instead of epoxy resin 1.

The distance of flow in spiral flow was determined in the same manner as in Example 1 by using the molding material thus prepared, and was 80 cm.

The molding material thus prepared was subjected to transfer molding in the same manner as in Example 1, whereby a mold-shaped cured product was obtained. The cured product after transfer molding was post-cured by further heating at 180° C. for 4 hours.

The specific gravity, the glass transition temperature and the heat conductivity of the cured product were determined in the same manner as in Example 1. The specific gravity was 3.00, the glass transition temperature was 155° C., and the heat conductivity was 9.8 W/(m·K).

The cured product was analyzed by an X-ray diffraction method using Cukα rays, and it was confirmed that the cured product formed a nematic phase.

Comparative Example 1

[Preparation and Molding of Molding Material]

A molding material was prepared in the same manner as in Example 1 except that 28.45 g of epoxy resin monomer 1 (ME21) and 8.70 g of the phenol curing agent were used instead of 29.25 g of epoxy resin 1 and 7.90 g of the phenol curing agent.

The molding material thus prepared was subjected to transfer molding in the same manner as in Example 1, but it was not able to obtain a mold-shaped cured product.

Comparative Example 2

[Preparation and Molding of Molding Material]

A molding material was prepared in the same manner as in Example 1 except that 26.80 g of epoxy resin monomer 2 (YL6121H) and 10.35 g of the phenol curing agent were used instead of 29.25 g of epoxy resin 1 and 7.90 g of the phenol curing agent.

The distance of flow in spiral flow was determined in the same manner as in Example 1 by using the molding material thus prepared, and was 72 cm.

Also, the molding material thus prepared was subjected to transfer molding in the same manner as in Example 1, whereby a mold-shaped cured product was obtained. The cured product after transfer molding was post-cured by further heating at 180° C. for 4 hours.

The specific gravity, the glass transition temperature and the heat conductivity of the cured product were determined in the same manner as in Example 1. The specific gravity was 3.00, the glass transition temperature was 160° C., and the heat conductivity was 10.3 W/(m·K).

The cured product was analyzed by an X-ray diffraction method using Cukα rays, and it was confirmed that the cured product formed a nematic phase.

Formulations and synthesis conditions for synthesis of the respective epoxy resins, as well as characteristics of the epoxy resins and the molding materials are summarized in Table 1 and Table 2. In Table 1 and Table 2, each numerical value in the column [Formulation for polymer synthesis] represents the amount (g) of each component to be compounded, and each "-" therein means no use of the relevant component. Each "-" in the columns [Polymer characteristics] and [Molding material characteristics] means the absence of the relevant item or no measurement of the relevant item. Although no epoxy resin was synthesized in each of Comparative Examples 1 and 2, numerical values with respect to each epoxy resin monomer used were described for reference.

TABLE 1

| | Items | | Example 1 | Example 2 | Example 3 | Example 4 | Example 5 | Comparative Example 1 |
|---|---|---|---|---|---|---|---|---|
| Formulation for polymer synthesis | Epoxy resin monomer 1 | ME21 | 50 | 50 | 50 | 50 | Mixing of epoxy resin 2 in Example 2 and triphenylmethane type epoxy resin | 100 |
| | Epoxy resin monomer 2 | YL6121H | — | — | — | — | | — |
| | Phenol compound 1 | Hydroquinone | 0.91 | 1.3 | 1.95 | — | | — |
| | Phenol compound 2 | Resorcinol | — | — | — | 1.3 | | — |
| | Synthesis solvent | Cyclohexanone | 80 | 80 | 80 | 80 | | — |
| | Curing catalyst | Triphenyl phosphine | 0.5 | 0.5 | 0.5 | 0.5 | | — |
| Synthesis conditions | Synthesis temperature [° C.] | | 160 | 160 | 160 | 160 | | — |
| | Synthesis time [hour] | | 5 | 5 | 5 | 5 | | — |
| Polymer characteristics | Solid content [%] | | 96.9 | 96.3 | 97.1 | 96.4 | | 100 |
| | Epoxy equivalent [g/eq] | | 241 | 256 | 263 | 256 | | 212 |
| | Number average molecular weight (product) | | 1210 | 1315 | 1520 | 1303 | | — |
| | Number average molecular weight (contained monomer) | | 494 | 531 | 583 | 536 | | 432 |
| | Softening temperature [° C.] | | 90-100 | 75-80 | 30-35 | 70-75 | | 146 (melting temperature) |
| Molding material characteristics | Spiral flow [cm] | | 50 | 58 | 66 | 66 | 63 | — |
| | Specific gravity | | 3.00 | 3.00 | 3.00 | 3.00 | 3.00 | — |
| | Glass transition temperature [° C.] | | 180 | 182 | 180 | 170 | 185 | — |
| | Heat conductivity [W/(m · K)] | | 11.6 | 11.6 | 11.5 | 10.5 | 10.3 | — |
| | X-ray diffraction* | | Sm | Sm | Sm | Sm | N | — |

*Sm: formation of smectic phase, N: formation of nematic phase

TABLE 2

| | Items | | Example 6 | Comparative Example 2 |
|---|---|---|---|---|
| Formulation for polymer synthesis | Epoxy resin monomer 1 | ME21 | — | — |
| | Epoxy resin monomer 2 | YL6121H | 40.6 | 100 |
| | Phenol compound 1 | Hydroquinone | 1.3 | — |
| | Phenol compound 2 | Resorcinol | — | — |
| | Synthesis solvent | Cyclohexanone | 80 | — |
| | Curing catalyst | Triphenyl phosphine | 0.5 | — |
| Synthesis conditions | Synthesis temperature [° C.] | | 160 | — |
| | Synthesis time [hour] | | 5 | — |
| Polymer characteristics | Solid content [%] | | 97.2 | 100 |
| | Epoxy equivalent [g/eq] | | 196 | 172 |
| | Number average molecular weight (product) | | 1102 | — |
| | Number average molecular weight (contained monomer) | | 496 | 354 |
| | Softening temperature [° C.] | | ≤30 | 105 (melting temperature) |
| Molding material characteristics | Spiral flow [cm] | | 80 | 72 |
| | Specific gravity | | 3.00 | 3.00 |
| | Glass transition temperature [° C.] | | 155 | 160 |
| | Heat conductivity [W/(m · K)] | | 9.8 | 10.3 |
| | X-ray diffraction* | | N | N |

*N: formation of nematic phase

As shown in Table 1, while no moldable molding material was able to be obtained in Comparative Example 1 in which epoxy resin monomer 1 having a mesogen backbone was used, a moldable molding material was able to be obtained in each of Examples 1 to 4, in which each epoxy resin having the same mesogen backbone as in epoxy resin monomer 1 was used, because fluidity was imparted to the epoxy resin. In particular, the heat conductivity of the cured product was very high in each of Examples 1 to 3 in which hydroquinone was used for epoxy resin synthesis.

In a case in which the ratio (Ep/Ph) of the number of equivalents (Ep) of the epoxy group in the epoxy resin monomer and the number of equivalents (Ph) of the phenolic hydroxyl group in the phenol compound in epoxy resin synthesis is higher (namely, the amount of phenol modified is smaller), moldability tends to be deteriorated. In a case in which the ratio (Ep/Ph) is lower (namely, the amount of phenol modified is larger), the glass transition temperature tends to be lower, while moldability is enhanced. The reason why the glass transition temperature is thus lower is because a lower Ep/Ph ratio in epoxy resin synthesis imparts a higher molecular weight and a longer distance between crosslinking points in a cured product.

As shown in Table 2, the fluidity was enhanced and the heat conductivity was comparable in Example 6 in which the epoxy resin having a mesogen backbone was used, as compared with Comparative Example 2 in which epoxy resin monomer 2 having the same mesogen backbone as in Example 6 was used.

The disclosure of Japanese Patent Application No. 2014-266106 filed on Dec. 26, 2014 is herein incorporated by reference in its entity.

All publications, patent applications, and technical standards mentioned in the specification are herein incorporated by reference to the same extent as if each individual publication, patent application, and technical standard were specifically and individually indicated to be incorporated by reference.

What is claimed is:

1. An epoxy compound represented by the following Formula (1):

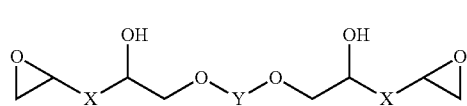

(1)

wherein, in Formula (1), each X independently represents a partial structure excluding epoxy groups derived from two glycidyl groups of 4-{4-(2,3-epoxypropoxy)phenyl}cyclohexyl 4-(2,3-epoxypropoxy)benzoate, and Y represents a phenylene group optionally having a substituent.

2. The epoxy compound according to claim 1, represented by at least one of the following Formulae (2-1) to (2-3):

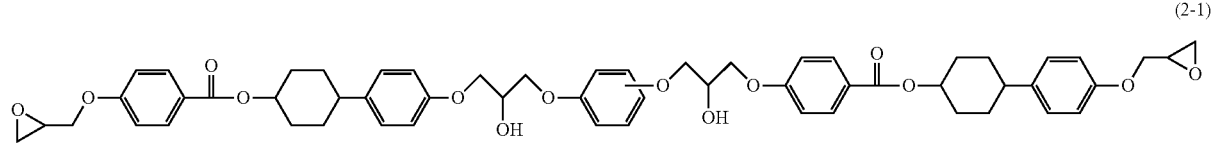

(2-1)

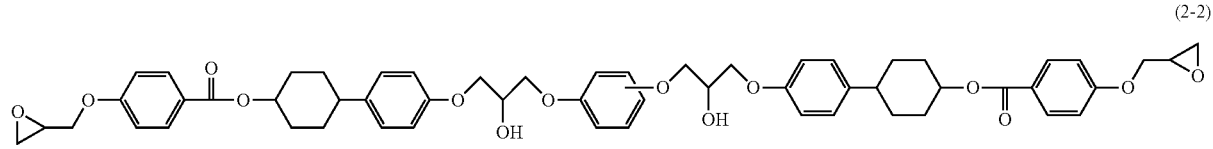

(2-2)

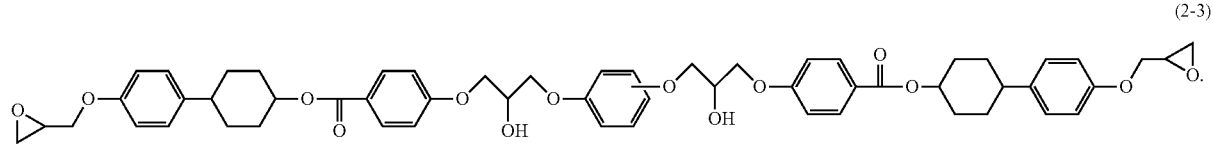

(2-3)

3. The epoxy compound according to claim 1, represented by at least one of the following Formulae (3-1) to (3-3):

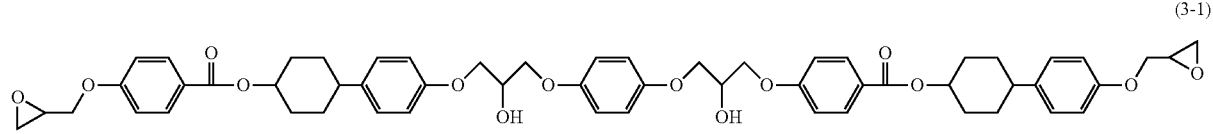

(3-1)

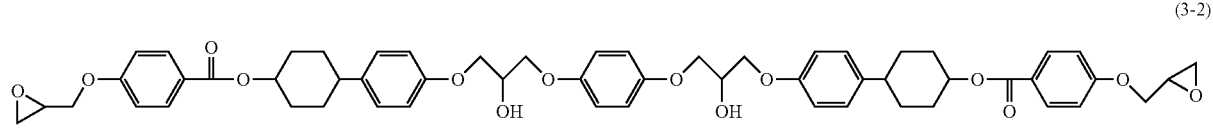

(3-2)

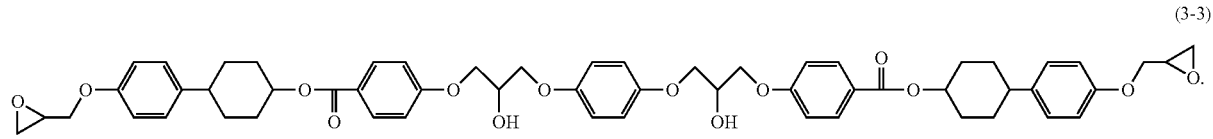

(3-3)

4. The epoxy compound according to claim 1, represented by at least one of the following Formulae (4-1) to (4-3):

(4-1)
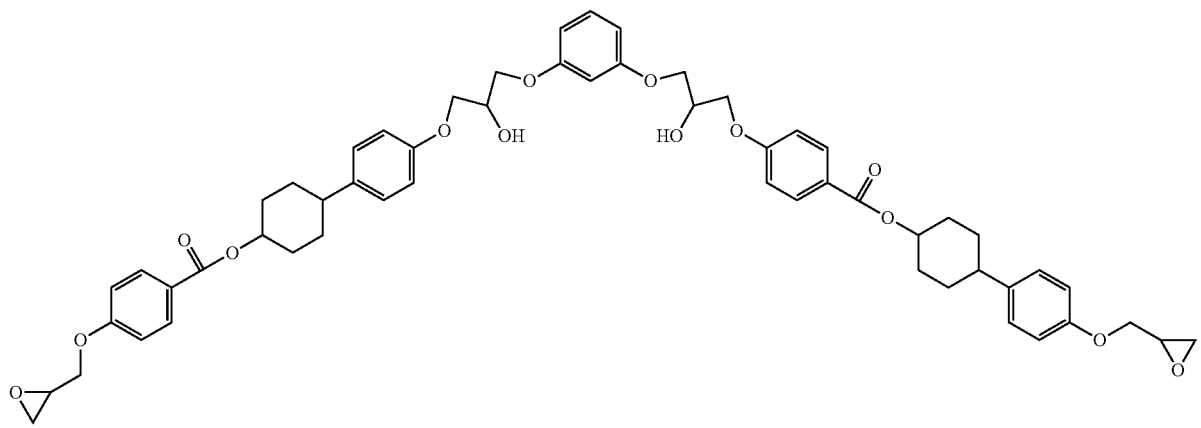

(4-2)
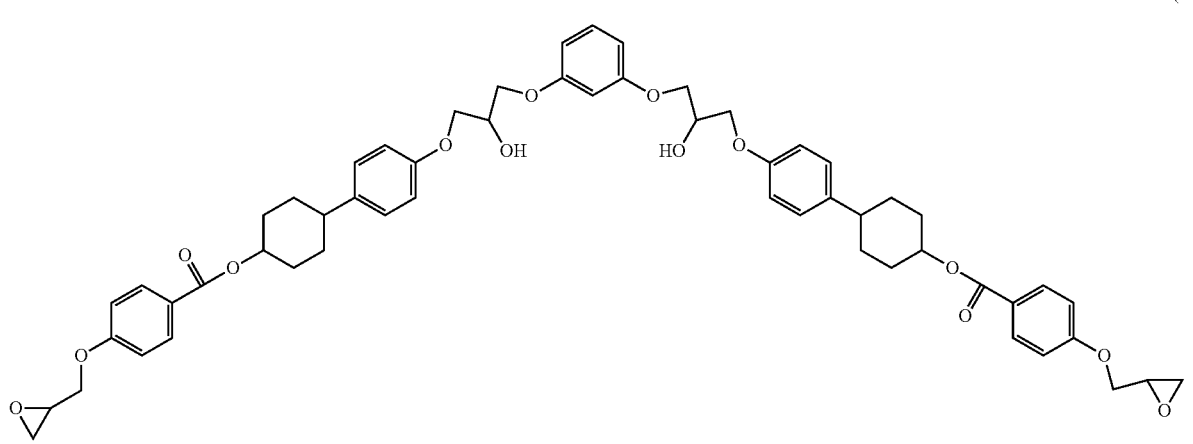

(4-3)
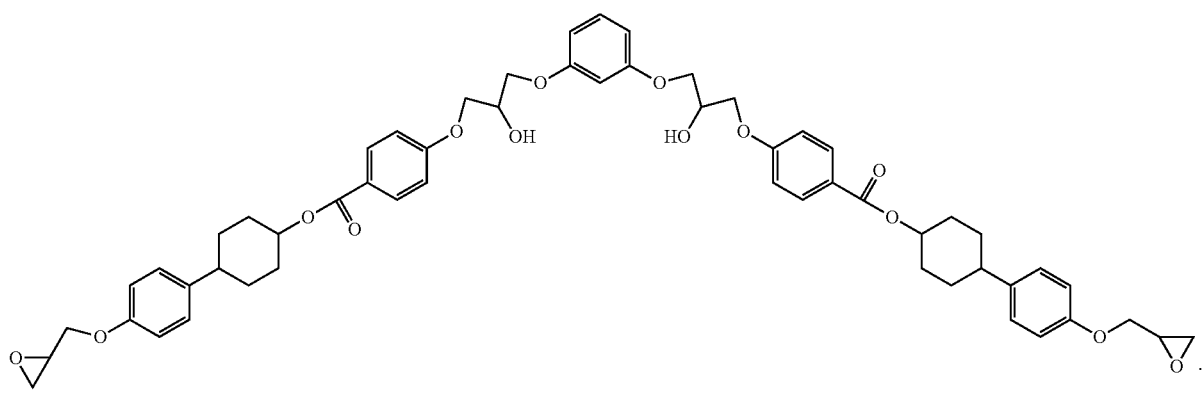

5. An inorganic filler-containing epoxy resin composition, comprising:
   the epoxy compound according to claim 1; and
   an inorganic filler.

6. The inorganic filler-containing epoxy resin composition according to claim 5, wherein a content of the epoxy compound in the inorganic filler-containing epoxy resin composition is from 1 to 50% by mass.

7. The inorganic filler-containing epoxy resin composition according to claim 5, wherein a content of the inorganic filler is from 60 to 90% by volume with respect to a total volume of the inorganic filler-containing epoxy resin composition being 100% by volume.

8. The inorganic filler-containing epoxy resin composition according to claim 5, wherein a content of the epoxy compound in the inorganic filler-containing epoxy resin composition is from 1 to 50% by mass.

9. The inorganic filler-containing epoxy resin composition according to claim 8 wherein a content of the epoxy compound in the inorganic filler-containing epoxy resin composition is from 30% by mass or less.

10. The inorganic filler-containing epoxy resin composition according to claim 5, wherein a content of the epoxy compound in the inorganic filler-containing epoxy resin composition is from 5 to 30% by mass.

11. The inorganic filler-containing epoxy resin composition according to claim 5, wherein a content of the inorganic filler is from 70 to 85% by volume with respect to a total volume of the inorganic filler-containing epoxy resin composition being 100% by volume.

12. The inorganic filler-containing epoxy resin composition according to claim 5, further comprising a phenol curing agent.

* * * * *